United States Patent
Sweeney et al.

(10) Patent No.: US 9,953,283 B2
(45) Date of Patent: Apr. 24, 2018

(54) CONTROLLING AUTONOMOUS VEHICLES IN CONNECTION WITH TRANSPORT SERVICES

(71) Applicant: Uber Technologies, Inc., San Francisco, CA (US)

(72) Inventors: Matthew Sweeney, Pittsburgh, PA (US); Emily Bartel, Pittsburgh, PA (US); Jean-Sebastien Valois, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/358,033

(22) Filed: Nov. 21, 2016

(65) Prior Publication Data
US 2017/0147959 A1    May 25, 2017

Related U.S. Application Data

(60) Provisional application No. 62/258,066, filed on Nov. 20, 2015.

(51) Int. Cl.
*G06Q 10/06* (2012.01)
*G05D 1/00* (2006.01)
*G07C 5/08* (2006.01)
*G07C 5/00* (2006.01)

(52) U.S. Cl.
CPC ... *G06Q 10/063114* (2013.01); *G05D 1/0022* (2013.01); *G05D 1/0027* (2013.01); *G07C 5/008* (2013.01)

(58) Field of Classification Search
CPC ............. G05D 1/0022; G05D 1/0027; G06Q 10/063114; G07C 5/008

USPC ...................................................... 701/2, 23
See application file for complete search history.

(56) References Cited

U.S. PATENT DOCUMENTS

| | | | |
|---|---|---|---|
| 6,542,111 B1 | 4/2003 | Wilson | |
| 6,795,031 B1 | 9/2004 | Walker | |
| 8,676,430 B1 | 3/2014 | Ferguson | |
| 8,825,265 B1 | 9/2014 | Ferguson | |
| 9,194,168 B1 * | 11/2015 | Lu | E05F 15/70 |

(Continued)

FOREIGN PATENT DOCUMENTS

| | | |
|---|---|---|
| JP | 2014-211862 | 11/2014 |
| WO | WO 2015-157974 | 10/2015 |

OTHER PUBLICATIONS

ISR and Written Opinion dated Feb. 16, 2017 in PCT/US2016/063203.

(Continued)

*Primary Examiner* — Tyler J Lee
(74) *Attorney, Agent, or Firm* — Mahamedi IP Law LLP

(57) ABSTRACT

Systems for controlling autonomous vehicles are disclosed. Using one or more location detection resources, the system can receive vehicle data from an autonomous vehicle as the autonomous vehicle progresses towards a pickup location of a requesting user and receive requester data from a mobile computing device of the requester. The system can determine when the autonomous vehicle and the requester are at or within a threshold distance of the pickup location. Subsequently, the system can instruct the autonomous vehicle to perform one or more non-driving operations to facilitate use of the autonomous vehicle by the requester.

23 Claims, 14 Drawing Sheets

(56) References Cited

U.S. PATENT DOCUMENTS

| | | |
|---|---|---|
| 9,384,402 B1 | 7/2016 | Furman |
| 9,436,182 B2 | 9/2016 | Nemec |
| 9,465,388 B1 | 10/2016 | Fairfield |
| 9,494,439 B1 | 11/2016 | Ross |
| 9,506,763 B2 | 11/2016 | Averbuch |
| 9,547,307 B1 * | 1/2017 | Cullinane ............ G05D 1/0088 |
| 9,552,564 B1 * | 1/2017 | Martenis .............. G06Q 10/083 |
| 2002/0026281 A1 | 2/2002 | Shibata |
| 2008/0027590 A1 | 1/2008 | Phillips |
| 2008/0059007 A1 | 3/2008 | Whittaker et al. |
| 2008/0086241 A1 | 4/2008 | Phillips |
| 2008/0215202 A1 * | 9/2008 | Breed ................ G01C 21/3611 701/25 |
| 2009/0140887 A1 * | 6/2009 | Breed ................ G01C 21/165 340/990 |
| 2009/0248231 A1 | 10/2009 | Kamiya |
| 2010/0082195 A1 | 4/2010 | Lee |
| 2010/0201829 A1 | 8/2010 | Skoskiewicz |
| 2010/0256836 A1 | 10/2010 | Mudalige |
| 2012/0101660 A1 | 4/2012 | Hattori |
| 2013/0090802 A1 | 4/2013 | Curtis |
| 2013/0099892 A1 | 4/2013 | Tucker |
| 2013/0158795 A1 | 6/2013 | Hahne |
| 2013/0190964 A1 | 7/2013 | Uehara |
| 2013/0246207 A1 | 9/2013 | Novak |
| 2014/0028440 A1 | 1/2014 | Takeuchi |
| 2014/0121964 A1 | 5/2014 | Stanley |
| 2015/0006005 A1 | 1/2015 | Yu |
| 2015/0104071 A1 | 4/2015 | Martin |
| 2015/0106010 A1 | 4/2015 | Martin |
| 2015/0178998 A1 | 6/2015 | Attard |
| 2015/0248131 A1 | 9/2015 | Fairfield et al. |
| 2015/0339928 A1 | 11/2015 | Ramanujam |
| 2016/0033963 A1 | 2/2016 | Noh |
| 2016/0054140 A1 * | 2/2016 | Breed ................ G01C 21/3611 701/408 |
| 2016/0061612 A1 | 3/2016 | You |
| 2016/0117610 A1 | 4/2016 | Ikeda |
| 2017/0115125 A1 | 4/2017 | Outwater |
| 2017/0153714 A1 | 6/2017 | Gao |
| 2017/0262802 A1 | 9/2017 | Swanson |

OTHER PUBLICATIONS

ISR and Written Opinion dated Aug. 11, 2016 in PCT/US2016/032549.

ISR and Written Opinion dated Sep. 14, 2017 in PCT/US2017/034819.

* cited by examiner (B)

CONTROLLING AUTONOMOUS VEHICLES IN CONNECTION WITH TRANSPORT SERVICES

RELATED APPLICATION(S)

This application claims benefit of priority to Provisional U.S. Patent Application No. 62/258,066, filed Nov. 20, 2015; the aforementioned priority application being hereby incorporated by reference in its entirety and for all purposes.

BACKGROUND

A service arrangement system can arrange a service to be provided for a requesting user through the use of computing devices. For example, a user can request a transport or delivery service by operating the user's mobile computing device, and the service arrangement system can process the request and assign a provider to provide the service for the user.

DETAILED DESCRIPTION

Figure 1A:
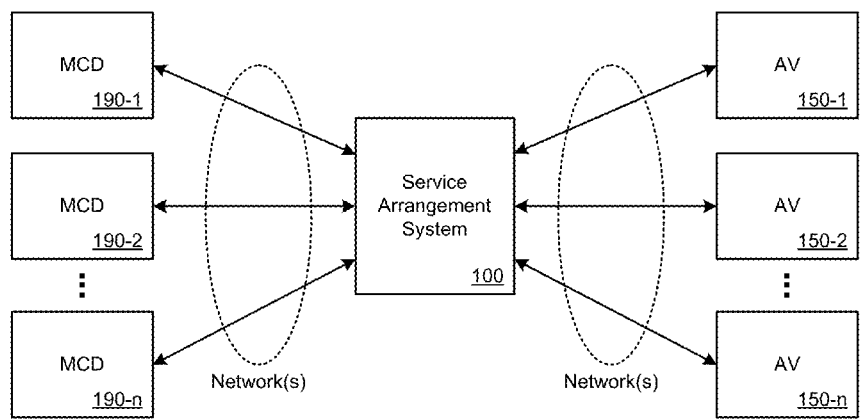
FIGS. 1A through 1C illustrate example systems to control or operate an autonomous vehicle in connection with a transport service.

Examples described herein provide systems to operate or control autonomous vehicles in connection with a network service. According to some examples, an entity can operate a service arrangement system that implements a network service in which users can request services using computing devices. The entity can also own and/or have control over a fleet of autonomous vehicles that can be used to provide the requested services. Such an autonomous vehicle can be instructed to perform a variety of operations in order to provide and properly complete a requested service for a user, such as a transport or delivery service.

In one example, a service arrangement system can receive a request for a transport service from a user's computing device and can select an autonomous vehicle to provide the transport service for that user. Such a user can operate a designated service application on the computing device that communicates with the service arrangement system over one or more networks in order to request the transport service. As described herein, an autonomous vehicle can correspond to a vehicle that can be driven without a human driver, and instead can be driven using sensors and other automation technology. The computing system of the selected autonomous vehicle can receive a set of instructions from the service arrangement system, and based on the set of instructions, can control the autonomous vehicle to travel to a specified location, such as a pickup location or current location of the user. The computing system and/or the service arrangement system can use a location detection resource(s) to determine when the autonomous vehicle is at or within a predetermined distance of the specified location. In response, the computing system and/or the service arrangement system can control and/or instruct the autonomous vehicle to perform operations to facilitate use of the autonomous vehicle for the user. For example, the computing system can operate a set of vehicle lights (e.g., emergency hazard lights, tail lights, headlights, etc.), a set of sound-making devices (e.g., a horn, audio output device, etc.), and/or a set of output components (e.g., a display device) of the autonomous vehicle for a duration of time.

Depending on implementation, the computing system can operate the lights, devices, and/or other components of the autonomous vehicle for a duration of time, such as for a predetermined duration of time (e.g., two minutes), until the computing system detects an event, or until instructed or triggered by the service arrangement system. By operating the lights, devices, and/or other components of the autonomous vehicle, such as in a predetermined or preprogrammed pattern or sequence for example, the computing system can provide a visual and/or auditory mechanism to enable the user to quickly and easily identify the autonomous vehicle assigned for that user.

Still further, the computing system of the autonomous vehicle and/or the service arrangement system can provide one or more security mechanisms to ensure that only the appropriate or permitted user(s) can enter and/or use the autonomous vehicle. For example, the locking mechanism of each door of the autonomous vehicle can be in a locked state (e.g., by default) when the autonomous vehicle is in motion or when the autonomous vehicle is in a waiting state (e.g., waiting at a location to receive instructions from the service arrangement system or waiting at a pickup location for the user). Depending on implementation, at various times and/or depending on real-time conditions, the computing system can be triggered to selectively deactivate or unlock the locking mechanism(s) of a respective door(s) of the autonomous vehicle. As an example, the computing system can receive a set of control signals from the service arrangement system, which can cause the computing system to deactivate or unlock one or more locking mechanisms. The service arrangement system can transmit the set of control signals in response to the user providing a specific set of user inputs on an application running on the user's computing device, and/or in response to detecting the location of the user's computing device.

The autonomous vehicle can also include one or more display devices, such as a touch-sensitive display device, to provide user interfaces for the user. Based on a state of operation of the autonomous vehicle (or the computing system of the autonomous vehicle), the computing system can generate and present different content on the display device. In different implementations, the computing system can operate in a first state in which a user interface is presented on the display device to enable the user to input or select a set of characters (e.g., alphanumeric characters). In response to receiving a specified set of characters, the computing system can operate in a second state in which the computing system initiates and performs a transport service preparation procedure. The transport service preparation procedure can use sensor data from a set of sensors of the autonomous vehicle to detect if certain conditions are satisfied.

As used herein, a client device, a computing device, and/or a mobile computing device refer to devices corresponding to desktop computers, cellular devices or smartphones, personal digital assistants (PDAs), laptop computers, tablet devices, etc., that can provide network connectivity and processing resources for communicating with a remote computing system(s) over one or more networks, such as a service arrangement system. A remote computing system can refer to one or more computing systems or servers that is remote from the client device or the mobile computing device (e.g., corresponds to the back-end server system of the network service). Still further, in examples described herein, a computing system of an autonomous vehicle can correspond to custom hardware of the autonomous vehicle, such as an in-vehicle or on-board computing system, that has network connectivity and location-determination capabilities. Such a computing system of an autonomous vehicle can communicate with the remote computing system(s) and/or the client device(s) over one or more networks.

Still further, examples described herein relate to a variety of location-based (and/or on-demand) services, such as a transport service, a delivery service, etc. to be arranged between users/requesters/riders and autonomous vehicles. In some examples, a service arrangement system can be implemented by any entity that provides transport or delivery services to be requested by users, and/or provides goods or services for purchase through the use of computing devices and network(s). For purpose of simplicity, in examples described herein, the service arrangement system can correspond to a transport arrangement system that arranges transport services to be provided for riders/users by vehicles (e.g., transporting objects or people).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1A illustrates an example diagram of a service arrangement system, as described herein. The service arrangement system 100 can correspond to a set of computing systems (e.g., computing devices, servers, data centers, etc.) that implement a network service. In examples described herein, the service arrangement system 100 can be operated and/or controlled by an entity that owns and/or controls a fleet of autonomous vehicles (AVs) 150 Each AV 150 can communicate with the service arrangement system 100 over one or more networks to receive instructions for performing actions, including moving to various locations at specified times. The service arrangement system 100 can also communicate with a plurality of mobile computing devices (MCDs) 190 operated by requesters or users of the network service. Individual MCDs 190 can store and run a designated client service application that communicates with the service arrangement system 100 over one or more networks. A user can operate the designated client service application to make a request for a service, such as a transport service or a delivery service. The service arrangement system 100 also communicate with a plurality of service provider devices, which are individually operated by human drivers (but are not illustrated in FIG. 1A for purpose of simplicity).

According to the example of FIG. 1A, when a user wants to request a transport service, the user can operate a MCD, such as the MCD 190-1, to communicate with the service arrangement system 100 over a network(s), e.g., a wireless networks, a cellular network, etc. The user can launch or open the designated client service application, which communicates with the service arrangement system 100 to receive information about the transport service in real-time or close to real-time (e.g., the estimated location of vehicles, the estimated time of arrival to the user's current location or a user-specified pickup location). By interacting with the designated client service application, the user can specify the pickup location, the destination location, and/or the vehicle type, and make a request for a transport service. Based on one or more of the user-specified parameters, the service arrangement system 100 can receive the request and programmatically select a service provider to provide the transport service. In one example, if the vehicle type requested by the user is an AV vehicle type, the service arrangement system 100 can select an available AV from the fleet of AVs 150. The service arrangement system 100 can instruct the selected AV, such as the AV 150-2, to travel to the pickup location in order to initiate and provide the transport service for the user.

Service Arrangement System

Figure 1B:
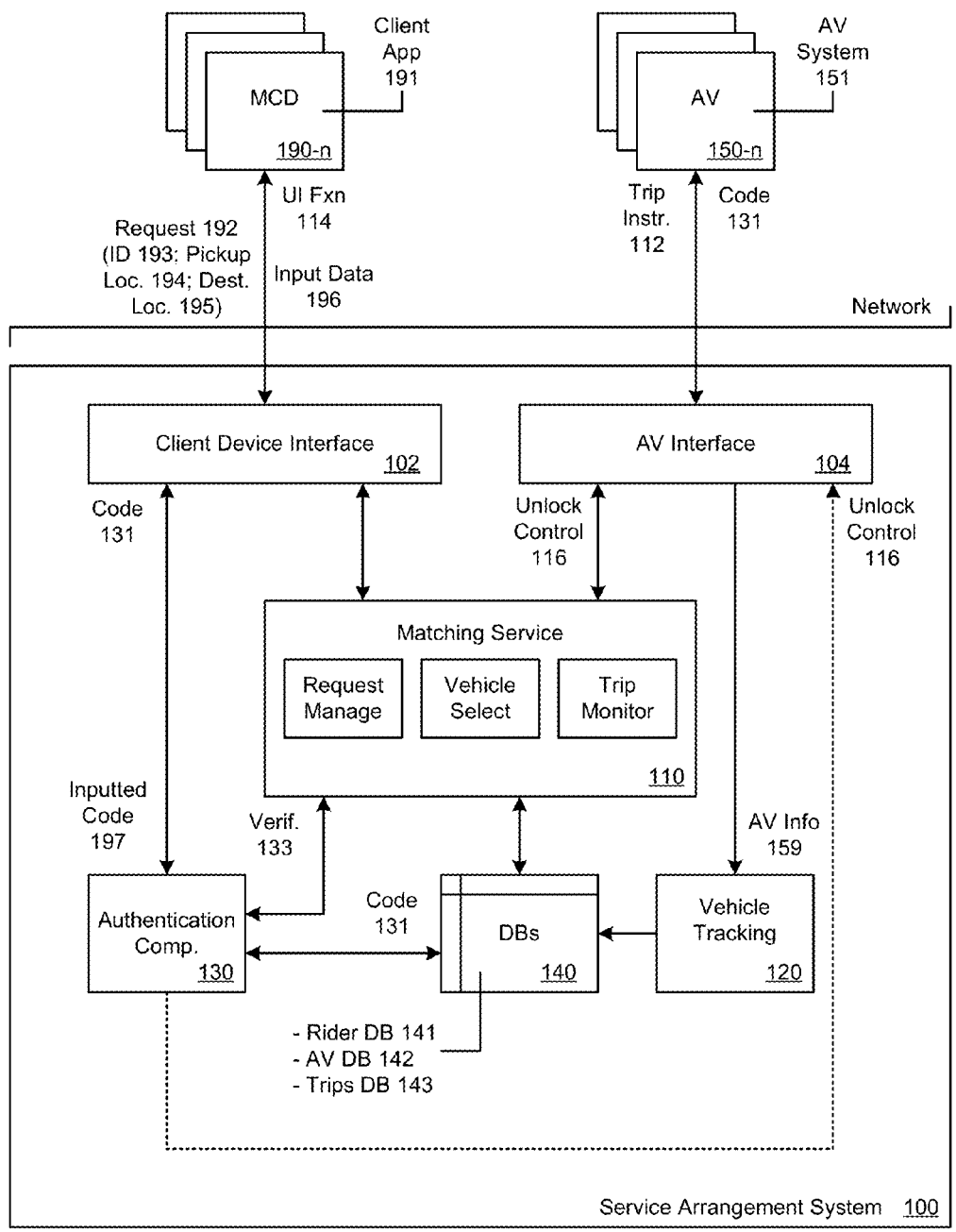

FIG. 1B illustrates components of the service arrangement system 100 of FIG. 1A, according to some examples. For example, the service arrangement system 100, which is also referred to herein as the system 100, can include a client device interface 102, an autonomous vehicle (AV) interface 104, a matching service 110, a vehicle tracking component 120, an authentication component 130, and a plurality of databases 140. For purpose of simplicity, other components of the system 100, such as a user interface component, other databases, etc., are not illustrated in FIG. 1B. The system 100 can be implemented on network side resources, such as on one or more servers or data centers, or implemented through other computer systems in alternative architectures (e.g., peer-to-peer networks, etc.).

In one example, the client device interface 102 enables the system 100 to exchange data between the system 100 and each of the MCDs 190 operated by requesters or users via the respective designated client service applications 191. Similarly, the AV interface 104 enables the system 100 to exchange data between the system 100 and each of the AVs 150 via the respective AV computing systems 151. The client device interface 102 and the AV interface 104 can use one or more network resources of the system 100 to exchange communications over one or more wireless networks (e.g., a cellular transceiver, a WLAN transceiver, etc.). In some examples, the client device interface 102 and/or the ACV interface 104 can include or use an application programming interface (API), such as an externally facing API, to communicate data with the respective systems. The externally facing API can provide access to the AVs 150 and/or the MCDs 190 via secure access channels over the network through any number of methods, such as web-based forms, programmatic access via RESTful APIs, Simple Object Access Protocol (SOAP), remote procedure call (RPC), scripting access, etc.

When a user requests a transport service using a MCD 190, the respective client application 191 can generate a request 192 and transmit the request 192 to the system 100. The request 192 can include an identifier (ID) 193 of the user, information of the pickup location 194 (e.g., a latitude and longitude coordinate, an address, an intersection, a point of interest name, etc.), information of the destination location 195, and/or a vehicle type information. The request 192 can also include other data, such as information associated with a payment method, a current location of the MCD 190, device information, etc. For purposes of this application, the vehicle type specified by the user, or alternatively, the vehicle type programmatically selected by the system 100, can correspond to an AV vehicle type.

In one example, a request manage component of the matching service 110 can process the request 192 by verifying the payment instrument of the user, providing information from the request 192 that affect the vehicle selection operation to the vehicle select component, providing feedback data to the client application 191, and/or creating and storing a data entry (e.g., a trip entry) associated with the request 192, such as in the trips database 143. The request manage component can access the rider database 141, for example, to verify the user's payment instrument in connection with a payment processing component (not shown in FIG. 1B). The vehicle select component of the matching service 110 can determine a pool of available vehicles corresponding to the specified vehicle type (e.g., available AVs 150) and select an AV from the pool to provide the transport service for the requesting user based on information from the request 192. As referred to herein, an available AV can be an AV that satisfies a set of criteria, such as having a current state in which the AV is online and functioning properly (e.g., a first state, capable of being assigned to provide a transport service or capable of traveling to the user's pickup location to provide the transport service) and/or is within a specified distance or estimated time of travel to the user's pickup location.

The vehicle selection component can access the AV database 142, which stores updated or real-time information of the AVs operating states and current locations. According to examples, the vehicle tracking component 120 can receive AV information 159 from each of the AV systems 151 of AVs 150, e.g., periodically or based on a predefined schedule. For an individual AV 150, the AV information 159 can include an identifier of the AV, a current location of the AV (e.g., a location data point, a GPS coordinate, or other location information describing the current location of the AV), the state of the AV or the respective AV system 151, a bearing or direction of travel of the AV, and/or other information about the AV, such as distance traveled, the amount of fuel or battery power remaining, AV hardware status information, etc. The vehicle tracking component 120 can continuously (or periodically) update the AV entries corresponding to the respective AVs 150 with the AV information 159. The vehicle selection component can access the AV database 142 in order to determine the pool of available AVs and select an AV from the pool to provide the requested service.

Once the vehicle select component selects the AV to provide the transport service (also referred herein as a trip), the matching service 110 can update the trip entry associated with the transport service (and/or the request 192) in the trips database 143 with information associated with the selected AV. The trip entry can include the ID of the rider 193, the ID of the AV, information about the pickup location 194, information about the destination location 195, the vehicle type (e.g., AV vehicle type), information about the payment instrument of the user, price parameters associated with the trip, and/or information associated with the AV when the AV was selected to provide the transport service.

The matching service 110 can also transmit a set of instructions to the AV system 151 of the selected AV, which directs or instructs the selected AV to travel from its current location to the pickup location of the user (referred to herein as trip instructions 112). The AV system 151 can process the trip instructions 112 to determine the location where the AV 150 should be controlled and moved to (e.g., the pickup location). The AV system 151 can then use sensor data from a set of sensors of the AV 150, as well as map information and/or navigation/routing information to control the AV 150 to travel to the pickup location. In some examples, the trip instructions 112 can also include other information, such as information about the destination location 195, user preferences specified by the user (if any), information to assist the AV in navigation (e.g., map information, routing information), etc. As an addition or an alternative, such information can be transmitted independent of the trip instructions 112, e.g., at a time after the matching service 110 transmits the trip instructions 112 to the selected AV.

The matching service 110 can also transmit data to the user's MCD 190 to provide a notification to the user that an AV has been selected for the user and to provide an estimated time of arrival to the user's pickup location. The notification can include information about the selected AV to be displayed on a user interface of the service application 191 (e.g., a vehicle model, color, image of the vehicle, an identifier, such as license plate number, etc.). In one example, the matching service 110 can include or communicate with a routing or mapping component (e.g., a routing engine) that determines the estimated time of arrival of the selected AV 150 from the location of the AV 150 when it was selected to the pickup location of the user. In another example, the AV system 151 can compute a route to travel from its current location to the pickup location of the user and determine the estimated time of arrival to the pickup location. The AV system 151 can transmit the estimated time of arrival to system 100, which then provides the information to the MCD 190 of the user.

A trip monitor component of the matching service 110 can track or monitor the location and/or status of the AV 150 (and/or the AV system 151) as the AV 150 travels to the pickup location (and subsequently, as the AV 150 transports the user from the pickup location to the destination location). As described herein, the AV system 151 can periodically provide AV information 159 to the system 100. Depending on implementation, the trip monitor component can periodically receive the location and/or status information of the AV 150 from the vehicle tracking component 120, periodically retrieve the location and/or status information of the AV 150 from the AV database 142, and/or periodically receive the AV information 159 from the AV interface 104.

According to some examples, individual AVs 150 can be securely locked, e.g., by default, so that when the AVs 150 are stationary at various locations, traveling to pickup locations, and/or traveling to destination locations, the locking mechanisms of the doors of the AVs 150 are activated (e.g., in a locked state) to prevent persons outside the vehicle from opening the doors. In order to provide protective measures for both the user and the AV 150, and to prevent potential fraudulent or criminal behavior, the system 100 can provide a mechanism(s) to ensure that the appropriate person(s) is permitted to enter and/or use the AV 150.

In one example, when the trip monitor component detects or determines that the selected AV 150 is at or within a predetermined distance of (or within a predetermined estimated time of arrival from) the pickup location of the user, the matching service 110 can provide the client application 191 of that user with additional functionality that was previously not available to the user's MCD 150 for a predetermined duration of time. Such additional functionality can correspond to providing one or more selectable features on a user interface (UI) of the client application 191 that the user can provide input(s) on or select in order to unlock one or more doors of the selected AV 150. The matching service 110 can provide the additional functionality by identifying the user's MCD 150 (or client application 191) using the user's ID 193 or another identifier(s) associated with that user or the user's MCD 150, and by transmitting data for enabling the additional UI functionality 114 to that MCD 150.

The data for enabling the additional UI functionality 114 can cause the client application 191 to present the one or more selectable features on the UI of the client application 191 for a predetermined duration of time. In an example, the UI can display textual content to notify the user that the AV 150 is at the pickup location or is arriving at the pickup location, and present a selectable feature (e.g., "Unlock Your AV") for a predetermined duration of time (e.g., three minutes, or five minutes, etc.). The user can be given only the set of amount of time to unlock the AV 150 and use the AV 150 as requested. Additionally, the UI can present a timer counting down to show the amount of time remaining of the predetermined duration of time.

If the user does not select the selectable feature during the predetermined duration of time (e.g., the timer expires), the matching service 110 can disable the additional functionality and cause the client application 191 to remove the one or more selectable features. The trip monitor component can determine that the transport service has been canceled for that user, and update the trip entry for that trip as such. The matching service 110 can also transmit a notification to the user's MCD to inform the user that the transport service has been canceled for the user for failure to use the AV in time. The client application 191 can subsequently display the home screen UI, which the user can interact with if he or she wishes to make another request for service. The trip monitor component can also provide a set of trip cancelation instructions to the AV 150, which the AV system 150 can process in order to change the state of the AV from "assigned, "on route," or "arrived" to being online and available. The trip monitor component and/or the vehicle tracking component 120 can update the AV 150's entry or profile in the AV database 142 as being online and available, along with the current location of the AV 150, so that the AV 150 can be subsequently selected by the matching service 110 for providing another transport service for another user.

On the other hand, if the user provides input and selects the selectable feature of the client application 191, the matching service 110 can receive the input data 196 corresponding to the selection (e.g., along with the user's ID 193 and/or another ID associated with the user's MCD 190 or client application 191). In one or more examples, the matching service 110 can then verify the ID associated with the user or the MCD 190, determine that the user has provided the specified input to unlock the AV 150, and/or transmit an unlock control signal(s) 116 to the AV system 151 of the AV 150 (e.g., using the AV's ID). The unlock control signal(s) 116 can cause the AV system 151 to control the locking mechanism(s) of the AV 150 to unlock the respective door(s) of the AV 150. The AV system 151 can deactivate the locking mechanism(s) of the respective door(s) of the AVs 150 to enable the user to open the door and enter the AV 150.

As an addition or an alternative, the AV system 151 can determine the location and position of the AV 150 relative to a street or a road (e.g., determine which sidewalk or side of the road the AV 150 is positioned) and the direction in which the AV 150 is facing. When the AV system 151 receives the unlock control signal(s) 116, the AV system 151 can select which locking mechanism(s) to deactivate (e.g., place in an unlocked state) to unlock the respective door(s) of the AV 150. For example, for a two-door vehicle with one door on each side of the AV 150, the AV system 151 can unlock the door that is adjacent to the sidewalk or the edge of the street and keep the other door that is facing the middle of the street remaining locked. In another example, for a four-door vehicle with two doors on each side of the AV 150, the AV system 151 can unlock both doors that is adjacent to the sidewalk. Still further, the AV 150 can include a set of displays or lights that can be activated to indicate to the user which door(s) is unlocked. For example, each door can include a display or a set of lights (e.g., affixed to the window, integrated in the surface of the door, positioned near the door handle, etc.) that the AV system 151 can selectively activate when that door is unlocked for the user.

Additionally or alternatively, the trip monitor component can determine the location and position of the AV 150 relative to a street or a road, the direction in which the AV 150 is facing, and which side of the street or the road the pickup location is at (and/or ping the user's MCD 190 to determine the current location of the user). Based on where the AV 150 is positioned relative to the pickup location and/or the user's location, the matching service 110 can transmit the unlock control(s) 116 to the AV system 151, which can selectively specify which door(s) the AV system 151 is to unlock.

In another example, the system 100 can use the authentication component 130 to ensure that the appropriate person has the ability to unlock and enter the AV 150. As the vehicle select component selects the AV 150 to provide the transport service for the user (or after the AV 150 is selected), the matching service 110 can trigger the authentication component 130 to generate a code 131 (e.g., a temporary verification code or password) and associate the code 131 with the user ID 193, the ID of the trip (e.g., associated with the trip entry), and/or the ID of the selected AV 150. The code 131 can correspond to a set of numbers, a set of letters, or a set of alphanumeric characters.

Depending on implementation, the authentication component 130 can generate the code (i) randomly, e.g., using a random number generator, or (ii) semi-randomly, such as using a random number generator and also modifying codes or excluding codes based on other factors. For example, the authentication component 130 can exclude using a randomly generated code if that code was previously generated and used for the user or for the AV 150 recently or within a past duration of time (e.g., used the last three years). In another example, the authentication component 130 can modify or exclude randomly generated codes based on geographic regions, such as based on the location of the user, the pickup location and/or the destination location, and/or the location of the AV 150 (e.g., the authentication component 130 can track which codes have been assigned to which users/trips/AVs in a geographic regions so as to prevent the same codes from being used in the same region by another user/trip/AV). Alternatively, rather than the system 100 using an authentication component 130 to generate a code, a user can specify the code when making the transport request (providing input on the UI of the client application 191) or by providing a user-specified code in the user's profile or account in the rider database 141.

The system 100 can provide the code 131 to the user's MCD 190. Depending on variations, the authentication component 130 can provide the code 131 to the client application 191 of the user, or the matching service 110 can transmit the code 131 to the client application 191. In one example, the code 131 can be transmitted with the confirmation notification that informs the user that an AV has been selected for the user. Alternatively, the code 131 can be transmitted at a different time, such as when the state of the AV 151 is "arrived" or "arriving now." In such examples, the code 131 can be displayed as an in-application message or notification in the service application 191, e.g., for a short, predefined duration of time. The user can also interact with the service application 191 to view the notifications page/UI to view the code 131 for the particular trip. Still further, in another example, the system 100 can provide the code 131 using a different communication medium, such as via a text message or an email message, independent of the client application 191.

When the trip monitor component detects or determines that the selected AV 150 is at or within a predetermined distance of the pickup location of the user, the matching service 110 can provide the client application 191 of that user with additional functionality that was previously not available to the user's MCD 150 for a predetermined duration of time. Alternatively, the matching service 110 can provide the client application 191 with additional functionality at a specified time before the estimated time of arrival of the AV 150 (e.g., once the AV 150 is determined to be two minutes away from the pickup location). In such examples, the additional functionality can correspond to providing an interactive feature on a UI of the client application 191 that enables the user to provide or select a set of characters. The interactive feature can correspond to a text field or a set of individual text boxes that the user can input alphanumeric characters in.

The user can provide an inputted code and submit the code in order to unlock the AV 150. The authentication component 130 can receive the inputted code 197 and perform a check with the code 131 for the user/trip/AV. If the user provides the incorrect code, the authentication component 130 (or the matching service 110) can provide a notification to the client application 191 informing the user that the code is invalid. In one example, the system 100 can also provide the user with only a limited number of attempts to provide the correct code. In another example, the system 100 can cancel the transport service for the user after the user provides an incorrect code or after the user provides an incorrect code a predetermined number of times. If the user provides the correct code, the authentication component 130 can provide a verification 133 to the matching service 110. According to an example, the matching service 110 can then determine that the user has provided the specified input to unlock the AV 150 and transmit an unlock control signal(s) 116 to the AV system 151 of the AV 150. Alternatively, in another example, the authentication component 130 can provide the unlock control signal(s) 116 to the AV system 151 after validating the inputted code 197.

Still further, in another example, the system 100 can transmit the code 131 for the user/trip/AV to the AV system 151 of the AV 150 (e.g., using the AV's ID). The AV system 151 can store the code 131 in a memory resource and perform a code validation operation to unlock one or more doors of the AV 150. For example, the AV 150 can have one or more sets of buttons or input mechanisms on the outside body or external surface of the AV 150 (e.g., on a door or near a door, near or on the handle of a door, etc.). When the AV system 151 determines that the AV 150 is at or within a predetermined distance of the pickup location of the user, the AV system 151 can change its operating state from a traveling or "on route" state (e.g., a second state) to an "arriving now" or "waiting" state (e.g., a third state). When the AV system 151 is in the third state, the AV system 151 can receive data inputted via the one or more sets of buttons or input mechanisms. If the user inputs the correct code 131, the AV system 151 can unlock the door(s) of the AV 150. In an example in which a set of input mechanisms is positioned on or near each door of a set of doors (e.g., each rear door has a set of input mechanism near the handle or the window), the AV system 151 can unlock the door of whichever input mechanism the user provides the code into. As described in the various examples, in this manner, the system 100 can provide a temporary authentication mechanism for the user for a specific trip and/or for the specific AV 150.

The trip monitor component (and/or the vehicle tracking 120) can continue to receive AV information 159 from the AV system 151, such as when the user opens the door(s) of the AV 150 or enters the AV 150, when the state of the AV system 151 changes, when the transport service is initiated, as the AV 150 travels to the destination location, and when the AV 150 completes the transport service.

Autonomous Vehicle System

Figure 1C:
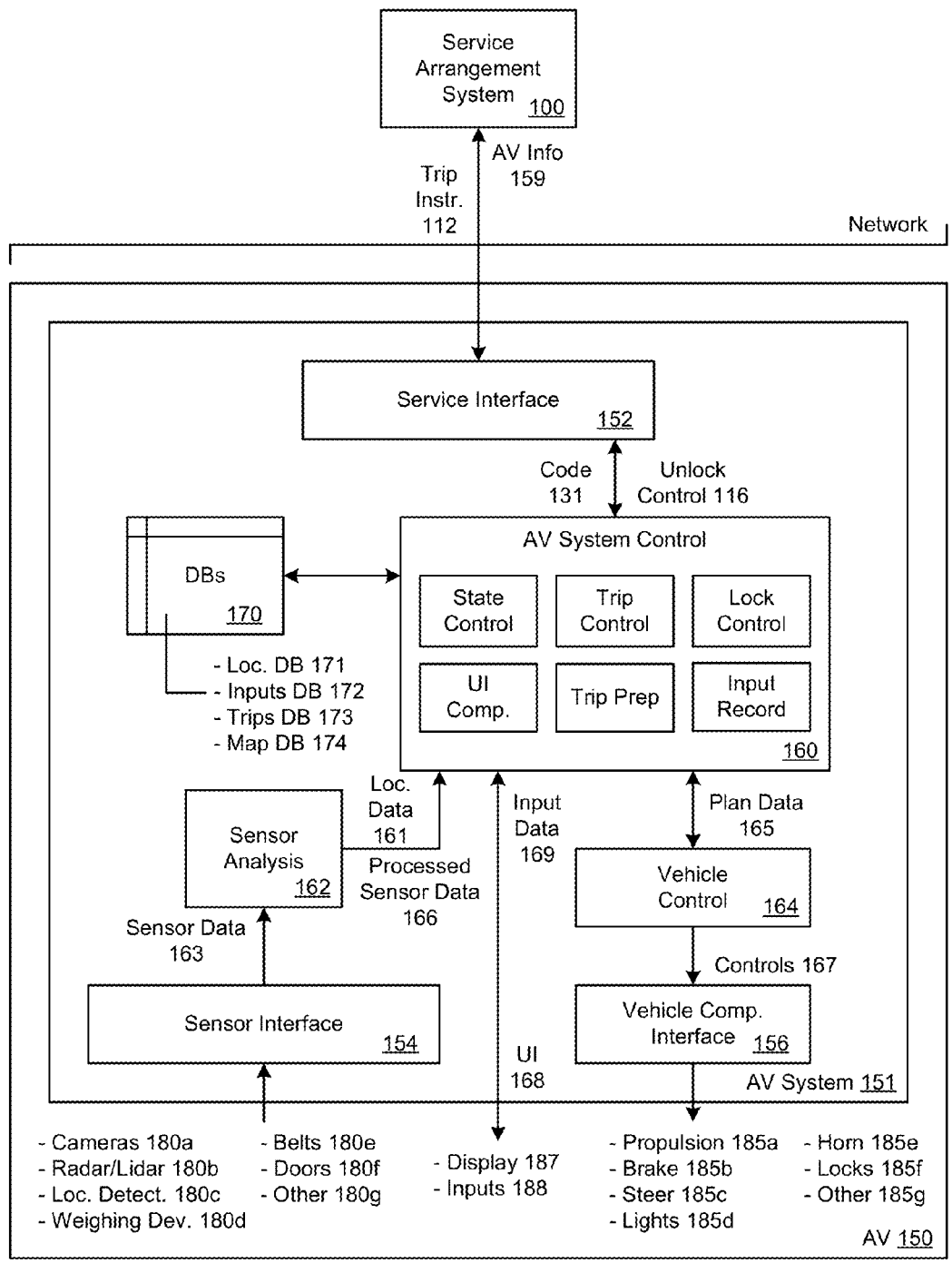

FIG. 1C illustrates components of an AV 150 as described in FIG. 1A and FIG. 1B, according to some examples. The AV 150 can include an AV system 151 and a plurality of hardware components, such as processing and memory resources, and vehicle components, such as a set of sensors (e.g., cameras 180*a*, radars/lidars 180*b*, location detection components 180*c*, weighing device sensors 180*d*, seat belt sensors 180*e*, door sensors 180*f*, and other sensors 180*g*), a set of displays 187 and/or input mechanisms 188 (e.g., including a touch-sensitive display(s)), and a set of vehicle functionality devices and sub-systems (e.g., propulsion sub-system 185*a*, a set of brakes 185*b*, steering sub-system 185*c*, lights 185*d*, a horn (s) 185*e*, locking mechanisms 185*f*, and other vehicle components 185*g*). The system 151 can be implemented by and operated on an in-vehicle computing system of the AV 150, through execution of instructions stored in one or more memory resources of the in-vehicle computing system. As described herein, the system 151 can include, be a part of, or correspond to an application or an operating system of the in-vehicle computing system that communicates with the service arrangement system 100 over one or more networks, such as described in FIGS. 1A and 1B.

According to the example of FIG. 1C, the system 151 can include plurality of interfaces, such as a service interface 152, a sensor interface 154, a vehicle component interface 156, an AV system control 160, a sensor analysis 162, a vehicle control 164, and a plurality of databases 170. For purpose of simplicity, other components of the system 151 are not illustrated in FIG. 1C. The components of the system 151 can combine to control and/or operate the AV 150 in connection with providing transport services. Logic can be implemented with various applications (e.g., software) and/or with hardware of the computing system that implements the system 151.

For purpose of simplicity, in describing FIG. 1C, the system 151 has been selected by the service arrangement system 100 to provide a transport service for a requesting user. The service arrangement system 100 can transmit trip instructions 112 to the system 151 over one or more networks via the service interface 152. The service interface 152 enables the system 151 to exchange data between the system 151 and the service arrangement system 100. For example, the service interface 152 can use one or more network resources of the in-vehicle computing system to exchange communications over one or more wireless networks (e.g., a cellular transceiver, a WLAN transceiver, etc.). The service interface 152 can include or use an application programming interface (API), such as an externally facing API, to communicate data with the service arrangement system 100. The externally facing API can provide access to the service arrangement system 100 via secure access channels over the network through any number of methods, such as web-based forms, programmatic access via RESTful APIs, Simple Object Access Protocol (SOAP), remote procedure call (RPC), scripting access, etc.

The AV system 151 can process the trip instructions 112 and control the AV 150 to travel to the pickup location specified by the user. According to some examples, the AV system 151 can be operating in a first state (e.g., an online and available state) before the AV 150 is selected to provide a transport service for the user. A state control component of the AV system control 160 can monitor and update the state information of the AV system 151. In one example, the AV system control 160 can enable or disable certain operations or processes based on the state of operation. When the trip instructions 112 corresponding to the user's request are received, the state control component can determine that the AV 150 has been assigned to provide a transport service for the user and change the operation of the AV system 151 from the first state to a second state (e.g., an "assigned" or "on route" state). The AV system 151 can determine what to do and/or where the AV 150 is to go based, at least in part, on information from the trip instructions 112.

According to an example, the AV system control 160 can determine, from the trip instructions 112, information about the requested transport service, such as the user ID, the pickup location of the user, the destination location of the user, information about the number of people or number of packages or luggage, etc. The AV system control 160 can also create a trip entry corresponding to the assigned transport service (which can be stored in a trips database 173), and update the trip entry with data from the trip instructions 112.

Using at least some information from the trip instructions 112, a trip control component of the AV system control 160 can plan a route to travel to the pickup location from the current location of the AV 150 (e.g., the AV 150 can be positioned at a particular location or can be in motion when it is assigned to provide the transport service). The AV system 151 can determine the current location of the AV 150 from data received from a location detection sensor(s) or component(s) 180*c* of the AV 150, such as a global positioning system (GPS) receiver. For example, the AV system 151 can communicate with, via a sensor interface(s) 154, a plurality of sensors of the AV 150, including the location detection component 180*c*. In one example, the sensor analysis 162 can analyze sensor data 163 received from the sensors and can periodically provide location data 161 (corresponding to the current location of the AV 150) to the AV system control 160. Alternatively, the AV system control 160 can periodically (or continuously) receive location data 161 from the location detection component(s) 180*c* of the AV 150 via the sensor interface 154. Still further, in some examples, the location data 161 of the AV 150 can be stored in the location database 171 and/or associated with the trip entry for the transport service.

Depending on variations, the trip control component can use location data 161 corresponding to the current location of the AV 150, the pickup location data point or address, map data stored in a maps database 174, a routing engine (not shown in FIG. 1C for purpose of simplicity), and/or map data and/or routing data received from the service arrangement system 100 in order to determine the route the AV 150 should travel to get to the pickup location. The determined route can be one having the estimated shortest travel time to the pickup location, one having the estimated shortest distance to travel to the pickup location, one avoiding certain roads or freeways or using certain roads of freeways, etc. Still further, the trip control component can periodically update the route as the AV 150 travels and based on real-time conditions determined by the sensor analysis 162.

For example, the AV 150 can include a set of sensors that provide information about the surrounding environment to the AV system 151. The set of sensors (e.g., external sensors) can include one or more cameras 180*a* (e.g., including stereo cameras) and/or one or more radars or lidars 180*b* that are positioned on the body of the AV 150. The sensor analysis 162 can use sensor data 163 received from the set of sensors to determine location data 161, determine vehicle position data (e.g., relative to other objects, bearing or direction the AV 150 is facing, etc.), and/or detect streets, sidewalks, and other objects (e.g., traffic lights, trees, other vehicles, people, bikers, signs, buildings, etc.), referred to as processed sensor data 166. The AV system control 160 can use the processed sensor data 166, along with the routing or navigation data, in order to continuously and/or periodically provide the vehicle control 164 with instructions on how to move the AV 150 to travel safely (e.g., to avoid accidents, to prevent the AV 150 from hitting objects, to follow traffic laws, etc.) to the pickup location (referred to herein as plan data 165). In some examples, the AV system control 160 can continuously and/or periodically update the plan data 165 based, at least in part, on the current location and position of the AV 150 and the environmental conditions surrounding the AV 150. In this manner, based on the detected environment surrounding the AV (from data periodically and continuously detected by the set of sensors), the AV control system 160 can periodically perform decision making operations that instruct the vehicle control 164 to take a certain action(s) to control the AV 150 to move to the specified location.

Based on the plan data 165, the vehicle control 164 can control the vehicle components of the AV 150 to move and/or position the AV 150 accordingly in order to safely travel to the pickup location (and after picking up the user, to safely travel to the destination location). The vehicle control 164 can use a set of control signals 167 to operate the various vehicle components and/or vehicle sub-systems, such as the propulsion sub-system 185*a* (e.g., to accelerate the AV 150), a set of brakes 185*b* or individual brakes 185*b* for individual wheels or tires (e.g., to decelerate or stop the AV 150), and the steering sub-system 185*c* (e.g., to steer the AV 150). In some examples, the vehicle control 164 can receive feedback data (e.g., such as information about the current speed of the AV 150, the acceleration or deceleration of the AV 150, the turning or banking speed of the AV 150, etc.) from the sensor interface 154, the sensor analysis 162, and/or the AV system control 160. For example, the AV 150 can include a speedometer and/or one or more inertial measurement units (IMUs) that can generate vehicle data and/or acceleration data that the vehicle control 164 can use as feedback in order to dynamically adjust the control signals 167.

In addition, as the AV 150 travels to the pickup location, the AV system control 160 can also provide AV information 159 to the service arrangement system 100, e.g., periodically or based on a specified schedule. The service arrangement system 100 can use the AV information 159 to monitor the AV 150 and to provide location information, status information, and/or estimated time of arrival of the AV 150 to the user (e.g., to the user's client application). For example, the service arrangement system 100 can determine when the AV 150 is at or within a predetermined distance or estimated time of arrival from the pickup location and transmit a notification to the client application to notify the user. Still further, in some examples, as the AV 150 travels to the pickup location (and after picking up the user, as the AV 150 travels to the destination location), the AV system control 160 can also update the trip entry with information about the AV 150's location (and associated timestamp). The AV system control 160 can also record, in the trip entry, the time and the location of the AV 150 when the trip instructions 112 were received, when the transport service started, and/or when the transport service ended.

According to some examples, the AV system control 160 can monitor the location of the AV 150 to determine if and when the AV 150 is at or within a predetermined distance or a predetermined estimated time of arrival from the pickup location (e.g., by periodically comparing the current location of the AV 150 with the stored pickup location). When the trip control component determines that the AV 150 is at or within the predetermined distance or predetermined estimated time of arrival from the pickup location, the AV system 151 can be placed in another state (e.g., a third state, such as a "arrived" or "arriving now" state) from the "on route" state. In some aspects, the service arrangement system 100 or the AV 150 adjusts a threshold for the predetermined distance based on activity levels around the pickup location. For example, if there are a large number of users requesting AVs near the pickup location, the predetermined distance can be set closer than if the requesting user is the only user in the area. In some examples, when the AV system 151 operates in the "arrived" state, the trip control component can cause the AV 150 to perform a set of operations to facilitate use of the AV 150 by the user. For example, when the vehicle control 160 controls the AV 150 to stop at a safe (and/or legal) location at or near the pickup location to wait for the user or to wait to initiate the transport service, the vehicle control 160 can provide a control signal(s) 167 to operate a set of lights 185*d*, a set of sound-making devices (e.g., speakers or a horn 185*e*), and/or a set of output components (e.g., display devices or array of light elements, such as light emitting diodes (LEDs)) in a predetermined pattern. In such an example, the user can be notified that the AV 150 is arriving or has arrived, and the AV 150 can make its presence known to the user by, for a duration of time, blinking headlights or taillights periodically, honking the horn periodically, and/or illuminating a pattern on the display or array of light elements. As a result of the AV 150 providing audible and/or visual output, the user can quickly and more efficiently identify the AV 150 as waiting to provide the transport service for the user (particularly on a street or parking lot or area where there are numerous cars).

In one example, the AV system control 160 can determine, from the processed sensor data 166, if there are a large number of vehicles (or objects) that are close nearby that are crowding or surrounding the AV 150 on one or more sides (e.g., within a specified distance from the AV 150). When the AV system control 160 determines that the AV 150 is positioned in such a manner relative to other vehicles or objects, the AV system control 160 can cause the vehicle control 164 to selectively operate the set of sound-making devices in a predetermined pattern (e.g., honk every five seconds, etc.), e.g., as opposed to the lights 185*d* or the set of output components, in order to provide an audible output for the user. Still further, as an addition or an alternative, during certain conditions, such as during nighttime or darkness, or during rain or snow, etc., where visibility can be low, the vehicle control 164 can selectively operate the set of sound-making devices in a predetermined pattern and a set of lights 185*d* in a predetermined pattern to assist the user in finding the appropriate vehicle.

When the AV system 151 is in the waiting or third state, in some examples, the AV system control 160 can receive an unlock control signal(s) 116 from the service arrangement system 100. In one example, when the AV system control 160 receives the unlock control signal 116, the AV system control 160 can cause the vehicle control 164 to cease operating the set of lights 185*d*, the set of sound-making devices (e.g., horn 185*e*), and/or the set of output components. As described with respect to FIG. 1B, the service arrangement system 100 can provide the unlock control signal 116 when the AV 150 is within a threshold distance of the pickup location and/or the user or when the user provides input, via the client application, to authenticate that he or she is the proper person to use the AV 150 and/or to unlock the AV 150. A lock control component 160 can receive the unlock control(s) 116, and depending on implementation, can cause the vehicle control 164 to deactivate all of, or selectively one or more of, the locking mechanisms (e.g., locks 185*f*) of the AV 150 to unlock all the doors of the AV 150, or selectively unlock the respective one or more doors, as described in FIG. 1B.

According to some examples, the lock control component can determine when the AV system 151 has deactivated one or more locking mechanisms 185*f*. If the lock control component determines that a predetermined duration of time (e.g., five minutes) has elapsed in which no doors of the AV 150 have been opened, or opened and closed (e.g., based on sensor data 163 associated with the one or more door sensors 180*f*), the AV system control 160 can cancel the trip for the user. In such an example, the state control component can change the state of the AV system 151 from the arrived or waiting state to the online and available state (e.g., the first state). The AV system control 160 can also transmit data indicating that the AV 150 will not be providing the transport service for the user to the service arrangement system 100. The service arrangement system 100 can then transmit a cancelation notification to the user's MCD. Still further, the lock control component can also cause the vehicle control 164 to activate the locking mechanisms 185*f* of the AV 150 to lock the doors of the AV 150.

In another example, the AV system control 160 can determine whether one or more locking mechanisms 185*f* should be deactivated using a short-range wireless communication transceiver or sensor. The service arrangement system 100 can provide, via the service interface 152, information about the user (e.g., the user ID) and/or information about the MCD of the user (e.g., device ID, device type, application version ID, etc.) to the AV system control 160. The AV system control 160 can periodically check for the presence of the user's MCD using the short-range wireless communication transceiver, such as Bluetooth or NFC, etc., and when the AV system control 160 detects the user's MCD, the lock control component can deactivate one or more locking mechanisms 185*f* of the AV 150.

As an addition or an alternative, the service arrangement system 100 can transmit a code 131 to the AV system 151. The AV system control 160 can store the code 131 with the trip entry, so that the code 131 is only associated with the particular user for the specific transport service. Alternatively, the AV system control 160 can generate a code and inform the service arrangement system 100 what the code is, in order for the service arrangement system 100 to provide In one example, as described in FIG. 1B, the lock control component can deactivate one or more locking mechanisms 185*f* of the respective doors of the AV 150 in response to the user inputting the correct code 131 in an input mechanism 188 of the AV 150. Still further, the AV system control 160 can use the stored code 131 to determine whether to provide the user with at least some access to the AV system 151.

For example, the AV system 151 controls the AV 150 to move to the pickup location of the user using at least a set of external sensors (e.g., a set of cameras 180*a*, and/or one or more radars/lidars 180*b*). When the AV system 151 determines that the AV 150 is at or within a predetermined distance of the pickup location, the AV system 151 can operate in a state in which a user interface (UI) component presents, on a display device 187 (such as a touch-sensitive display device), a UI 168 to enable the user/rider to input or select a set of characters. The AV system 151 can operate the display device 187 in a power-saving mode or keep the display device 187 turned off while the AV 150 is traveling to the pickup location and/or when the AV 150 is not providing transport service (e.g., no one is in the vehicle).

The AV 150 can include one or more display devices 187 that a rider can view content on and interact with via user input mechanisms 188 (e.g., a touch-sensitive display device). Depending on implementation, a display device 187 can correspond to (i) a tablet device that communicates with the AV system control 160 wirelessly and/or using a cable, (ii) a touchscreen device that is incorporated into or built into one or more surfaces of the interior cab of the AV 150, such as on a moveable table inside the cab, on a dashboard region near the front of the vehicle, on the rear surface of a seat or headrest, etc., and/or (iii) a touchscreen that is incorporated into a window of the AV 150. When the AV system control 160 presents a first UI 168 to enable the user to input or select a set of characters, and subsequently receives a specified set of characters from the input data 169 provided by the user, the AV system control 160 can perform a verification to determine whether the input data 169 matches a required character string or code (e.g., an AV generated code or the code 131) to allow the user to have access to the AV system 151. If the user inputs the correct code, the AV system control 160 can give the user access to the rider control software or application (RCA) of the AV system 151, in which the user can have at least some access to the AV system 151 and can control, in part, the AV 150. The UI component can provide UIs 168 of the RCA to allow the user to view information about the AV, change destinations, request help, view a map, etc.

In addition, if the user inputs the correct code, the AV system control 160 can also operate in a subsequent state in which the AV system control initiates and performs a transport service preparation procedure. A trip preparation component can initiate and perform the transport service preparation procedure, which includes checking for rider safety, checking the status of the AV 150 (e.g., temperature of engine or AV, tire pressure, fuel and/or battery levels, etc.), and/or checking the functionality of AV 150 sensors and vehicle components before initiating the transport service (e.g., before moving the AV 150 from the stationary position). The trip preparation component can use processed sensor data from the sensor analysis 162 (corresponding to a set of internal sensors of the AV 150, such as a weighing device sensor(s) 180*d* in each seat of the AV 150, a seat belt sensor(s) 180*e* for each set of the AV 150, door sensors 180*f*, etc.) in order to determine (i) when each door of the AV 150 is properly closed, and when a seatbelt is properly fastened for each rider in the AV 150. In other examples, the trip preparation component can also use, alone or in combination, other internal sensors, such as an internal stereo camera that is in the interior cab, microphones, etc., to determine the presence of people in the AV 150 and to also check that the right seatbelts are fastened. Based on the checks satisfying thresholds and/or predetermined baseline measurements, such as when each door is properly closed and each seatbelt is properly fastened for each rider, the trip preparation component can complete the transport service preparation procedure and the AV system control 160 can cause the vehicle control 164 to begin controlling the AV 150 to the destination location (or another location inputted by the user).

The AV system control 160 can also include an input record component that stores the various input data 169 provided by users of the AV 150 (e.g., across multiple transport services by different users). The input record component can store information about the types of inputs or selections made by users, as well as the frequency and times such inputs were received (and the location and/or status of the trip when such inputs were received), in the inputs database 172. During scheduled times or periodically, the input record component can transmit data from the inputs database 172 to the service arrangement system 100 for future processing. In examples described herein, while the RCA can provide, as part of the UIs 168, predefined selectable features to cause the AV system control 151 to do something, the RCA can also provide features to enable users to make customized requests or instructions as part of the transport services. In some examples, based on the input data collected from a set of AVs, the service arrangement system 100 can compile the input data of the customized requests or instructions and the contexts in which the inputs were made, and generate new features/buttons for the UIs 168 of the RCAs of AVs 150. The AV system control 160 can be updated with new programming to provide the new features and the features can be associated with corresponding actions the AV system control 160 and/or the vehicle control 164 are to make.

Methodology

Figure 2:
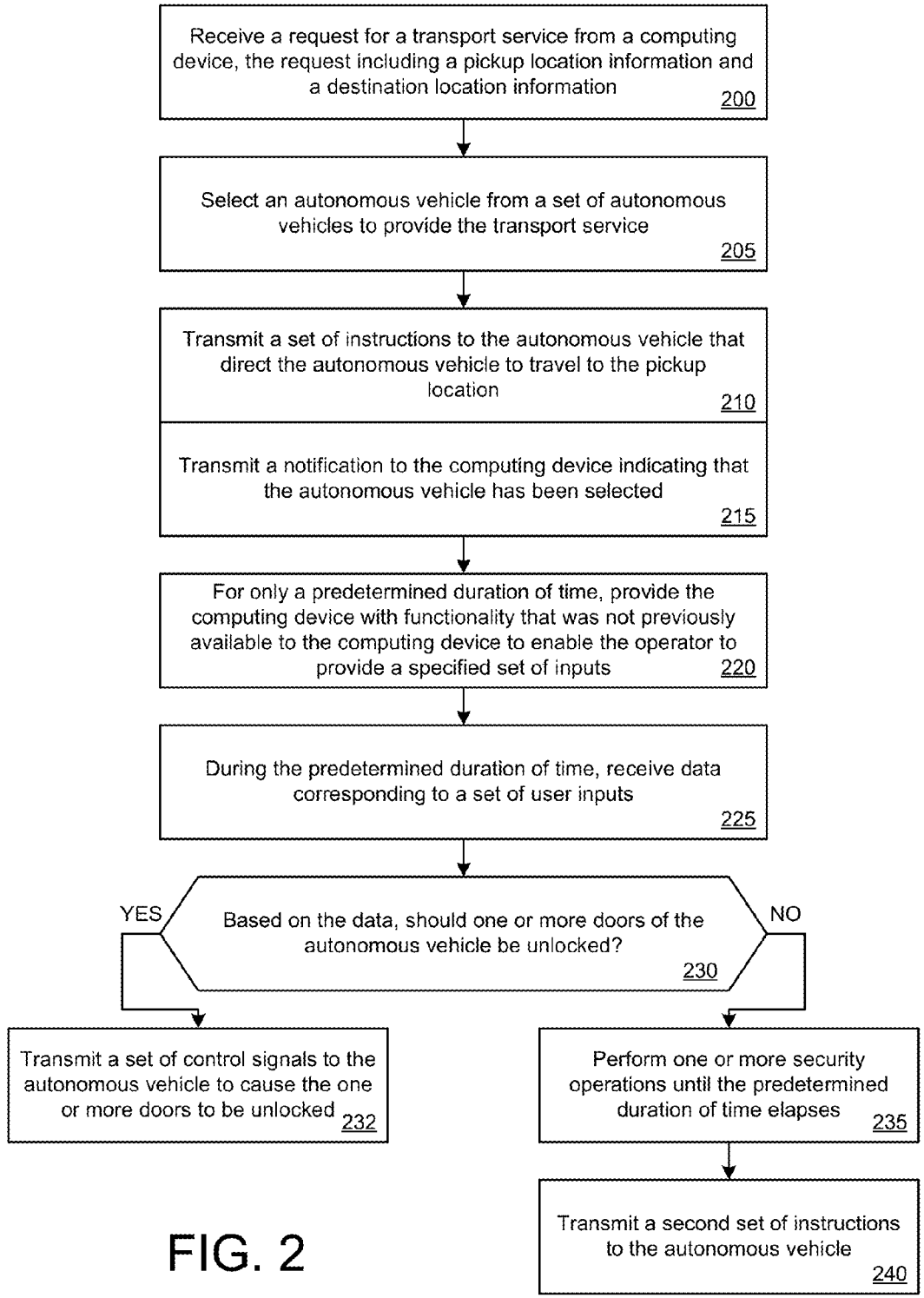
FIG. 2 illustrates an example method for controlling an autonomous vehicle in connection with a transport service.
Figure 3A:
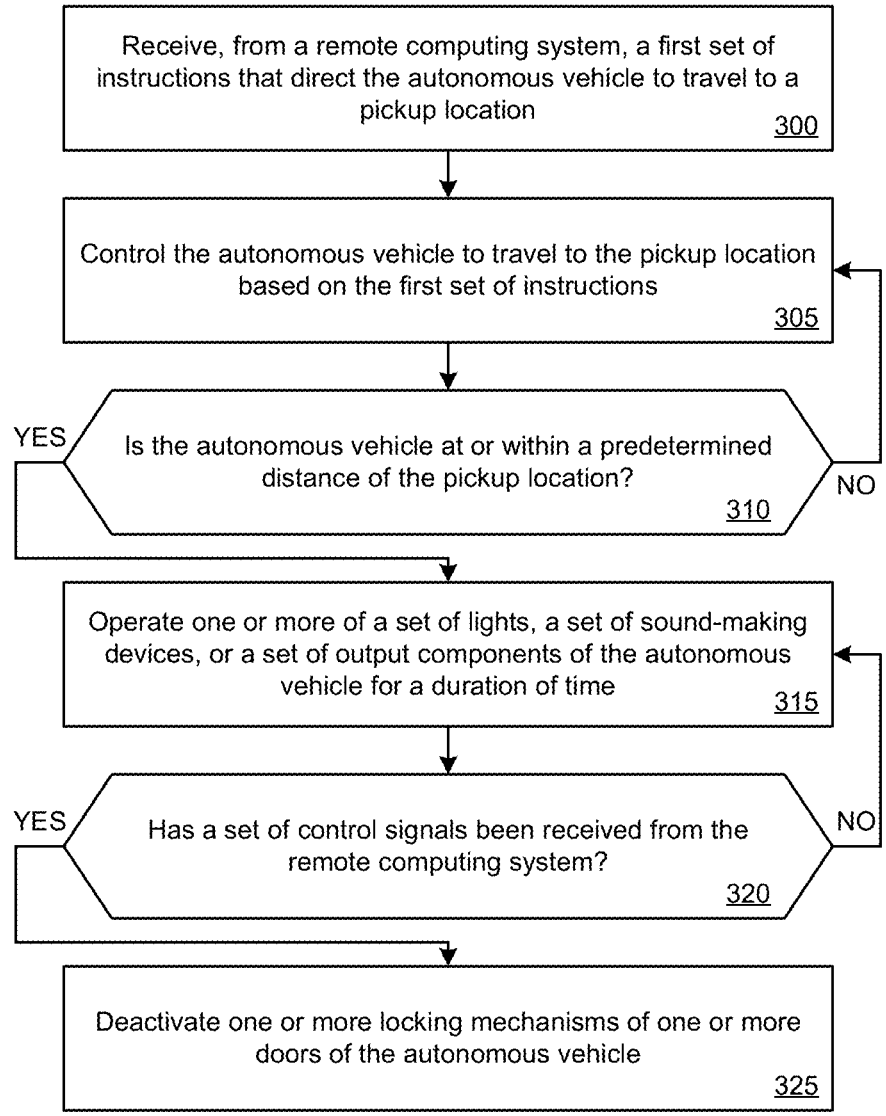
FIGS. 3A and 3B illustrate another example method for controlling an autonomous vehicle in connection with a transport service.
Figure 3B:
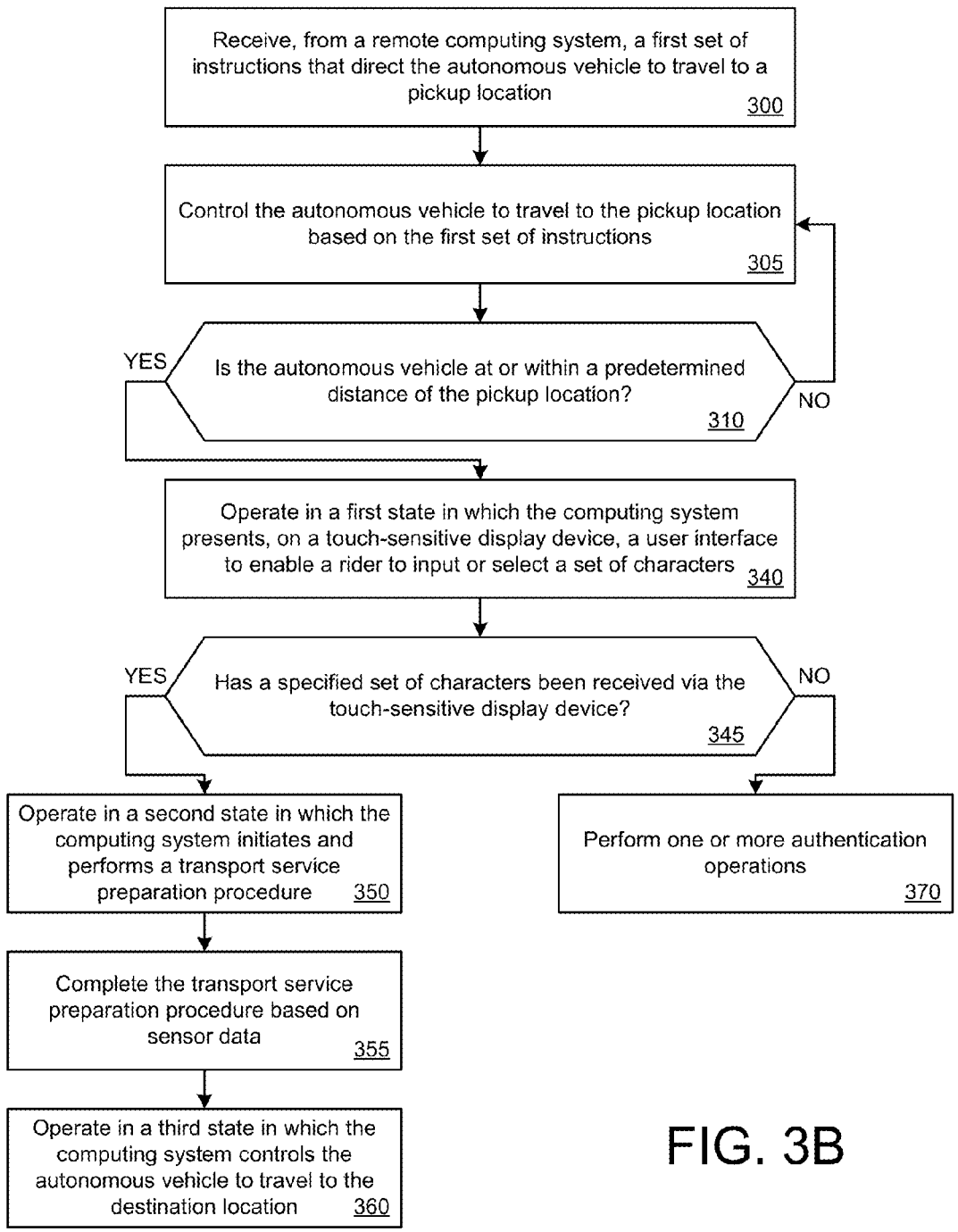

FIG. 2 illustrates an example method for controlling an autonomous vehicle in connection with a transport service. FIGS. 3A and 3B illustrate another example method for controlling an autonomous vehicle in connection with a transport service. Methods such as described by examples of FIGS. 2, 3A, and 3B can be implemented using, for example, components described with examples of FIGS. 1A through 1C. Accordingly, references made to elements of FIGS. 1A through 1C are for purposes of illustrating a suitable element or component for performing a step or sub-step being described. Still further, although some examples describe operations or processes as being performed by a service arrangement system, in other examples, one or more operations or processes can be performed by a computing system of an autonomous vehicle, and vice versa.

Referring to FIG. 2, a service arrangement system 100 can receive a request for a transport service from a MCD 190 of a user (200). The MCD 190 can store and run a client service application 191 that can generate the request and transmit the request to the service arrangement system 100. The request can include a pickup location information and/or a destination location information, the user ID, and/or a vehicle type (e.g., an AV vehicle type ID for purpose of this example). The pickup location information can correspond to a user-selected location or a current location of the MCD 190.

The service arrangement system 100 can determine a pool or set of autonomous vehicles (AVs) that are online and capable of providing transport services, and from the pool of AVs, can select an AV 150 to provide the transport service/trip for the user (205). In one example, the service arrangement system 100 can use the location information and/or the bearing information of each AV in the pool to determine which AV is has the shortest estimated time of arrival to the pickup location. The service arrangement system 100 can then transmit a set of instructions to the selected AV 150 over one or more networks (210). The set of instructions can direct the AV 150 to travel from the current location of the AV 150 to the pickup location of the user. In some examples, the service arrangement system 100 can also concurrently (or subsequently) transmit a notification to the MCD 190 of the user indicating that the AV 150 has been selected for the user (215). The notification can include information about the AV 150, such as the model or type of AV, the color, a photograph of the AV 150, an identifier of the AV 150, etc.

Figure 4A:
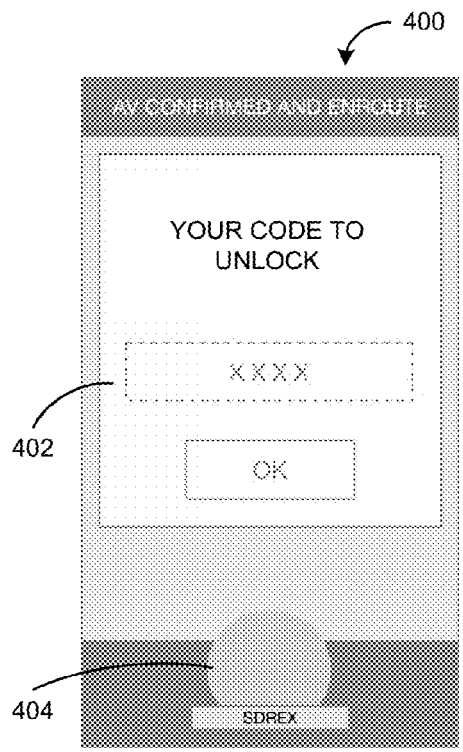
FIG. 4A-C illustrates examples of user interfaces displayed on a mobile computing device in various use case examples.
Figure 4B:
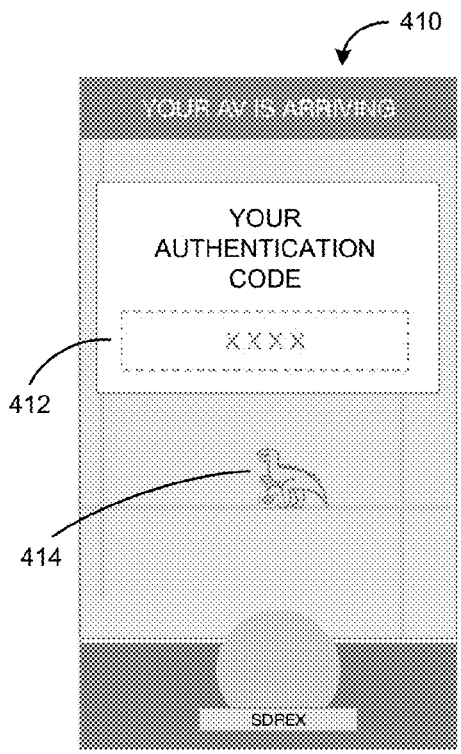
Figure 4C:
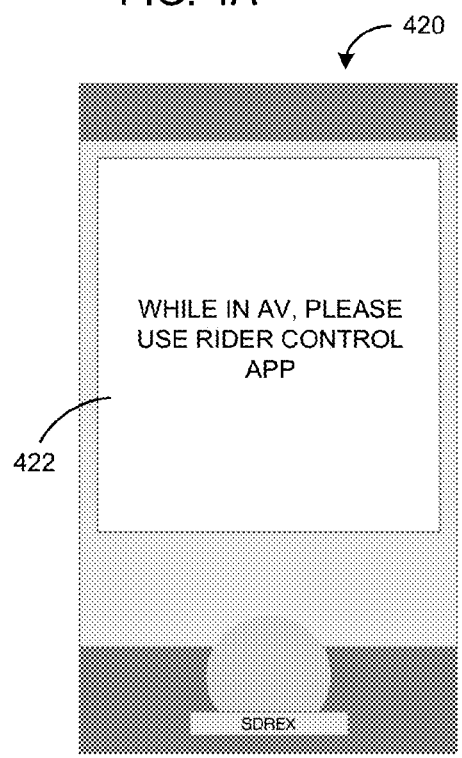

For example, FIGS. 4A-C illustrate examples of user interfaces displayed on a mobile computing device of the user in various use case examples. According to an example, in diagram A, the user interface (UI) 400 of the client application 191 can display information that an AV has been selected for the user (having an identifier "SDREX" and an image 404 or photo of the AV. The UI 400 can also include a panel 402 that is displayed for a predetermined duration of time to inform the user of the temporary code (XXXX) that the user can use to unlock the AV (in one example) and/or to unlock the AV computing system for accessing the AV (in another example).

Referring back to FIG. 2, the service arrangement system 100 can monitor the progress or travel of the AV 150 to the pickup location. At a specified time (e.g., when the AV 150 is selected for the user, or when the AV 150 is estimated to be three minutes away from the pickup location) or in response to detecting the location of the AV 150 relative to the pickup location or the MCD's current location (e.g., is at or within a predetermined distance of the pickup location), the service arrangement system 100 can provide the MCD 190 or the client application 191 with additional functionality that was not previously available to the MCD 190 or the client application 191 to enable the user to provide a specified set of inputs (e.g., in order to unlock the AV 150) (220). This functionality can be provided, in some examples, for only a predetermined duration of time, such as a five minutes or ten minutes, such that after the predetermined duration of the time, the functionality is disabled or removed from the MCD 190. During this time, the user can provide inputs, such as a selection of a feature (e.g., "unlock AV") or an input of a code. In some aspects, the service arrangement system 100 can instruct the AV 150 to perform one or more operations in response to detecting the location of the AV 150 relative to the pickup location or the MCD's current location, prior to receiving user input. For example, the service arrangement system 100 can instruct the AV 150 to deactivate one or more locking mechanisms on the doors of the AV 150 in addition to or instead of enabling additional functionality on the MCD 190.

For example, in diagram B, the UI 410 can be displayed by the client application 191 of the user's MCD 190. The UI 410 can display a map showing the user's current location or pickup location and the position of the AV using a graphic image 414 (e.g., as shown by an image of a dinosaur or a car). When the AV is determined to be at or within the predetermined distance or estimated travel time of the pickup location, the UI 410 can be triggered to display information that the AV is arriving (or has arrived) and to provide a panel 412 as a result of the additional functionality that is enabled on the user's MCD 190 for a predetermined duration of time. In one example, the panel 412 can include a feature(s) to enable the user to input the code in a text box to unlock the AV, such as illustrated in FIG. 4B.

Referring back to FIG. 2, when the service arrangement system 100 receives data corresponding to a set of user inputs (225) via the client application 191 during the time the functionality is available, the service arrangement system 100 can determine, based on the received data, whether one or more doors of the AV 150 should be unlocked (230). If yes, the service arrangement system 100 can transmit a set of control signals to the AV 150 to cause the one or more doors to be unlocked (232). Still further, in one example, at this time, the service arrangement system 100 can also transmit a message or notification to the client application 191 to inform the user that when the user is in the AV 150, the user should interact with and use the rider control application of the AV 150. An example of this message is illustrated FIG. 4C, which depicts the UI 420 of the client application 191 displaying a notification 422 informing the user which device to use when being transported by the AV. According to one example, when the user has entered the AV 150, when the user has control or access to the AV system 151 (e.g., can interact with the RCA), and/or when the trip is in progress (e.g., has started for the user, but has not ended yet), the service arrangement system 100 can disable one or more features of (or prevent access to) the client application 191. In such an example, because the user has handed off control from the client application 191 to the RCA, the user can access the RCA to view information about the trip and control the AV 150 using just the AV system 151.

Again, referring back to FIG. 2, if the doors of the AV 150 should remain locked, the service arrangement system 100 can perform one or more security operations until the predetermined duration of time elapses (235). The security operation(s) can include messaging the MCD 190 of the user with additional queries to verify the user's identity or transmitting a new code to the MCD 190 in response to receiving validation or confirming that the appropriate user and/or MCD 190 should be provided a code. If the duration of time elapses before the service arrangement system 100 receives the appropriate data from the MCD 190, the service arrangement system 100 can cancel the trip for the user, transmit a notification to the MCD 190, and can transmit a second set of instructions to the AV 150 to cause the AV 150 to be available to receive subsequent transport service assignments (240).

FIGS. 3A and 3B illustrate processes implemented by an AV computing system of an AV, such as the AV system 151 of an AV 150 of FIGS. 1A through 1C. Referring to FIG. 3A, in one example, the AV system 151 can receive, from the service arrangement system 100, a first set of instructions that direct the AV 150 to travel to a pickup location of a user (300). The service arrangement system 100 can transmit the first set of instructions when the AV 150 is selected to provide the transport service for the user. The AV system 151 can process the first set of instructions in order to determine a route the AV 150 should travel from its current location to the pickup location. The AV system 151 can use information from the first set of instructions, map data, sensor data from a set of external sensors of the AV 150 (e.g., stereo camera(s), lidar(s), etc.), and/or location information from the location detection component(s) of the AV 150 to control the AV 150 to safely travel to the pickup location (305).

As the AV 150 travels, the AV system 151 can periodically check the location of the AV 150 relative to the pickup location. In one example, the AV system 151 can periodically determine if the AV 150 is at or within a predetermined distance or predetermined estimated travel time from the pickup location (310). If the AV 150 is not at or within the predetermined distance of the pickup location, the AV system 150 can continue to control the AV 150 to the pickup location. On the other hand, when the AV system 151 determines that the AV 150 is at or within the predetermined distance of the pickup location, the AV system 151 can, based on predetermined instructions or parameters, operate one or more of a set of lights, a set of sound-making devices, or a set of output components of the AV 150 in a predetermined pattern or sequence (315). Depending on implementation, the AV system 151 can use a timer to operate the described AV devices or components for only a specified duration of time (e.g., activate and deactivate lights to blink, or periodically honk the horn, etc.) or until one or more control signals are received from the service arrangement system 100 or until another triggering event is received.

According to one example, at a time after the AV system 151 operates the one or more sets of AV devices or components, the AV system 151 can determine when it receives a set of control signals from the service arrangement system 100 (320). If not, in one example, the AV system 151 can continue to operate the one or more sets of AV devices or components for a duration of time, or until another triggering event is detected (e.g., receives a cancellation message or receives an updated set of trip instructions from the service arrangement system 100, etc.). If yes, the AV system 151 can deactivate one or more locking mechanisms of the one or more respective doors of the AV 150 (325). In some examples, the AV system 151 can receive the set of control signals from the service arrangement system 100 in response to the user providing the appropriate input on the user's client application 191. Alternatively, as opposed to receiving a set of control signals from the service arrangement system 100, the AV system 151 can deactivate the one or more locking mechanisms when it receives the appropriate code that is inputted by the user using an input mechanism on the AV 150, or when it detects, via sensor data from one or more sensors of the AV 150, that the user's MCD 190 is within a predetermined distance of the AV 150 (e.g., using short range wireless radio signals).

FIG. 3B illustrates another process implemented by an AV computing system of an AV, such as the AV system 151 of an AV 150 of FIGS. 1A through 1C. According to some examples, one or more steps described in FIG. 3B can be performed concurrently with one or more steps of FIG. 3A. Referring to FIG. 3B, the AV system 151 can receive, from the service arrangement system 100, a first set of instructions that direct the AV 150 to travel to a pickup location of a user (300), such as described in FIG. 3A. The AV system 151 can control the AV 150 to safely travel to the pickup location (305). As the AV 150 travels to the pickup location, the AV system 151 can periodically check the location of the AV 150 relative to the pickup location. In one example, the AV system 151 can periodically determine if the AV 150 is at or within a predetermined distance or predetermined estimated travel time from the pickup location (310).

If the AV 150 is not at or within a predetermined distance or predetermined estimated travel time from the pickup location, the AV system 151 continues to control the AV to move to the pickup location. On the other hand, if the AV 150 is at or within a predetermined distance or predetermined estimated travel time from the pickup location, the AV system 151 can operate in a first state in which the AV system 151 presents, on a touch-sensitive display device, a user interface to enable a rider (presumably the user) to input or select a set of characters (340). The display device can be provided in the interior cab of the AV 150 and accessible by the user once the user has entered the vehicle. Alternatively, the AV system 151 can operate in the first state when it detects that the user has entered the AV 150, via sensor data detected by internal sensors of the AV 150 (e.g., internal camera, weighing device sensors, door sensors, etc.).

Figure 4D:
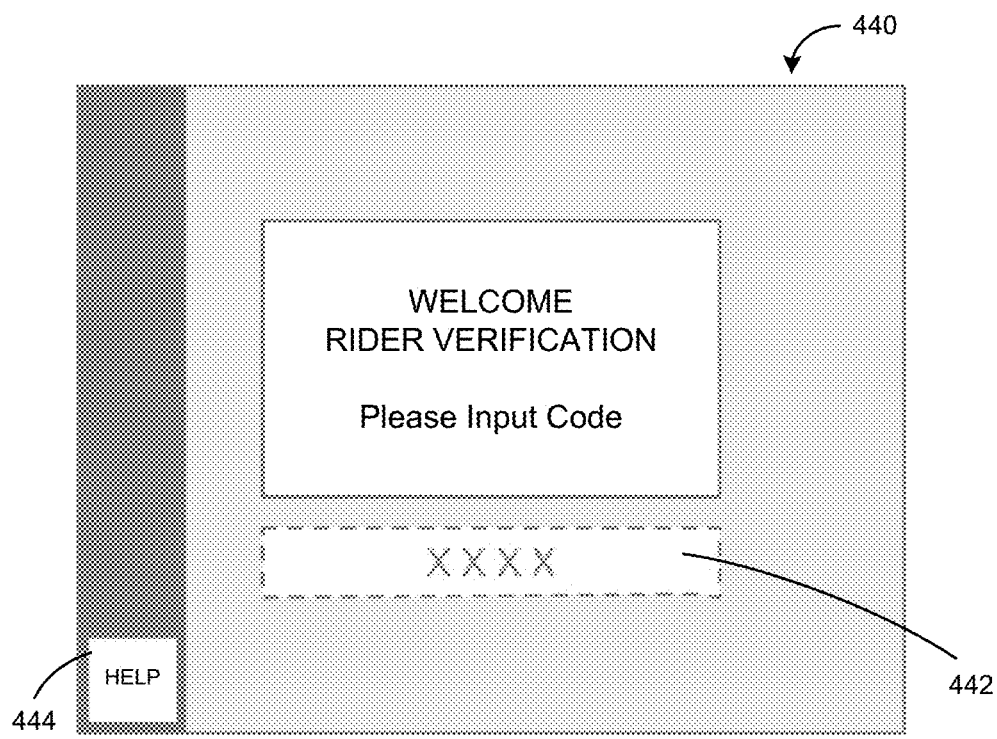
FIG. 4D-M illustrates examples of user interfaces displayed on a display device associated with an autonomous vehicle in various use case examples.

For example, FIGS. 4D-M illustrate examples of user interfaces displayed on a display device associated with an autonomous vehicle in various use case examples. As illustrated in FIG. 4D, the AV system 151 can present a UI 440 on the display device to enable the user to input a set of characters in the input field 442. As an example, if the user touches the region of the input field 442, a virtual keyboard can be displayed on the display device to enable the user to select alphanumeric characters to input an unlock code. The UI 440 can also include a help feature 444 that is available on most (if not all) UIs of the rider control software or application (RCA) of the AV system 151. In one example, if the user selects the help feature 444, the AV system 151 can provide additional options, such as a feature to call emergency services, a feature to connect with another device or system operated by a customer service representative, or a feature to request the AV 150 to make an emergency stop. Still further, a physical stop button can be provided in the cab of the AV 150 that the user can press (e.g., under a protective plastic container) in times of emergency, which can also cause the AV 150 to move to a safe stop (e.g., a location determined by the AV system 100 to be the nearest location for a safe rider exit).

Referring back to FIG. 3B, the AV system 151 can determine if a specified set of characters (e.g., a code or password) has been received via the touch-sensitive display device (345). If the user has inputted an incorrect set of characters, the AV system 151 can perform one or more authentication operations (370). The authentication operation(s) can include allowing the user a specified number of chances to input the correct code, asking the user a security question that the user must answer correctly in order to have the option of inputting the code again, and/or transmitting a message to the service arrangement system 100 to inform the service arrangement system 100 that the user is not valid. The service arrangement system 100 can take further security measures to ensure the user is the appropriate user for the AV 150.

Figure 4E:
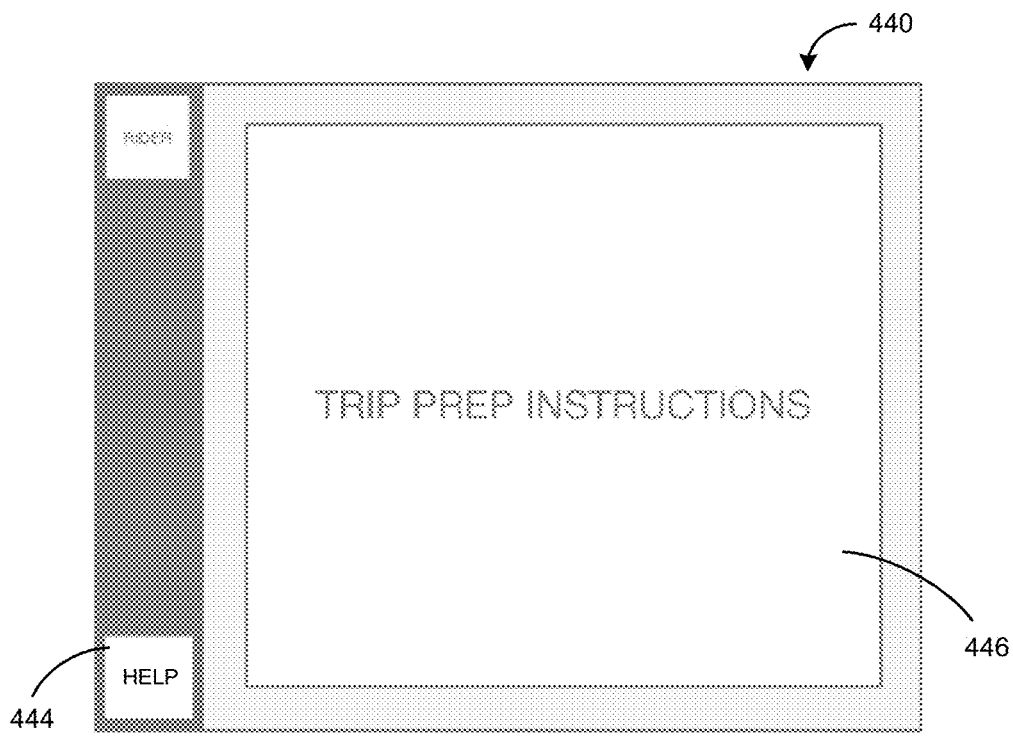

On the other hand, if the AV system 151 determines that the correct set of characters have been inputted by the user, the AV system 151 can operate in a second state in which the AV system 151 initiates and performs a transport service preparation procedure (350). For example, FIG. 4E illustrates a panel 446 on the UI 440 that describes that the transport service preparation procedure has been initiated. The panel 446 can be displayed, for example, after providing audible and/or visual feedback to the user indicating that the password or code has been approved or that the user has been authenticated. In one example, the AV system 151 can display on the UI 440 and/or output audio for a short duration of time, a greeting or user-specific information as feedback for the user to confirm that the user is in the appropriate vehicle (e.g., "Hi John").

Figure 4F:
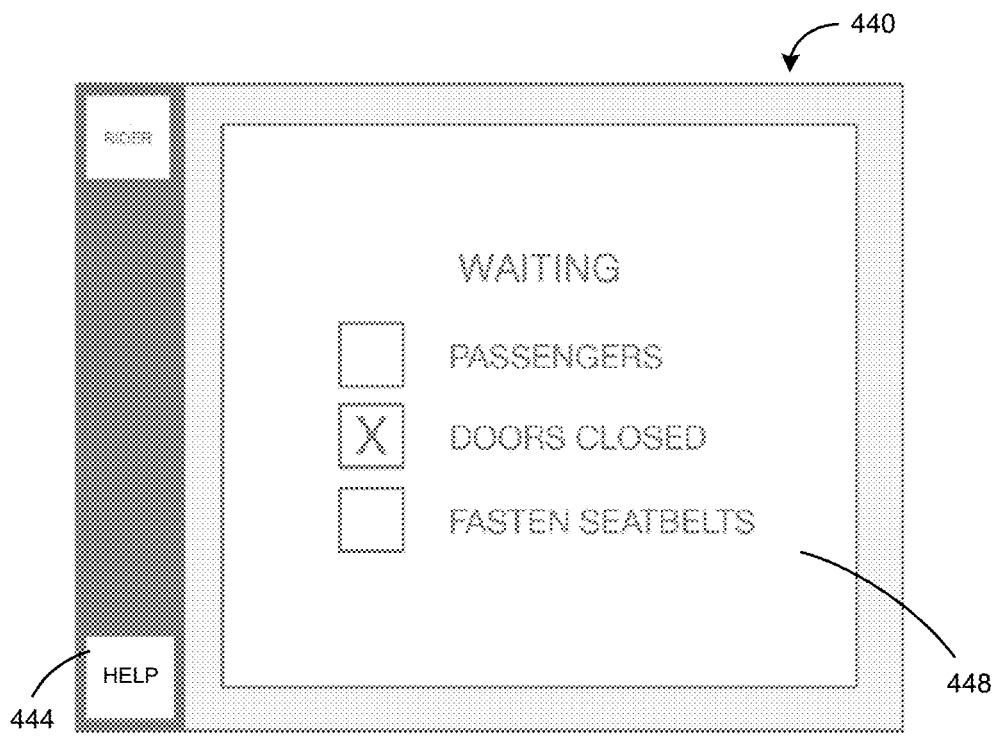
Figure 4G:
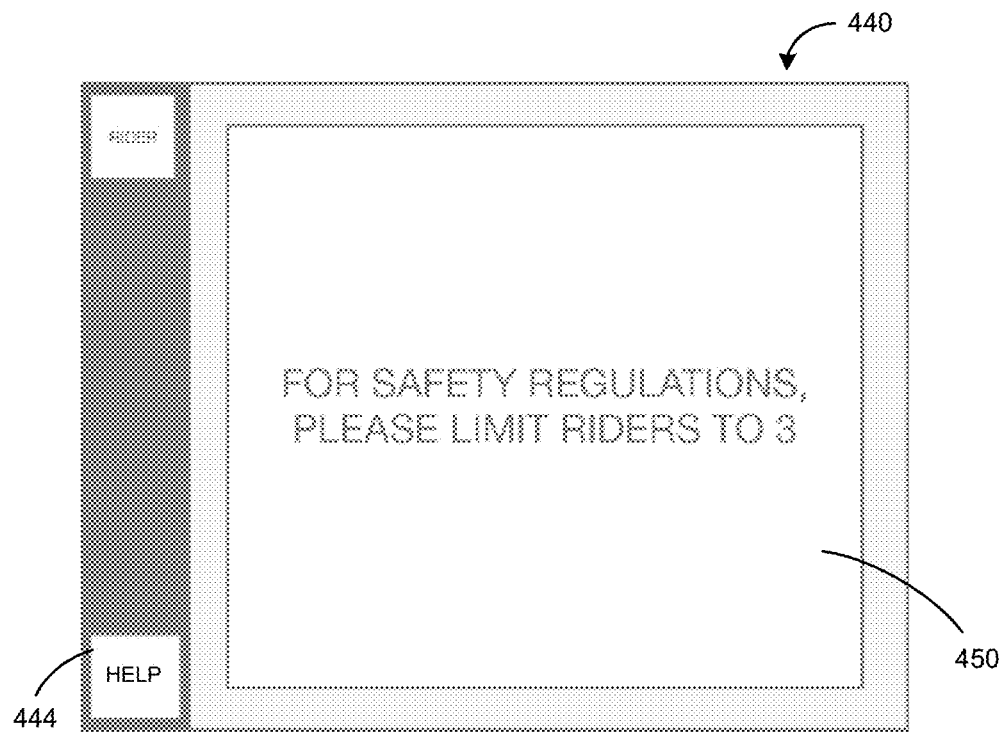
Figure 4H:
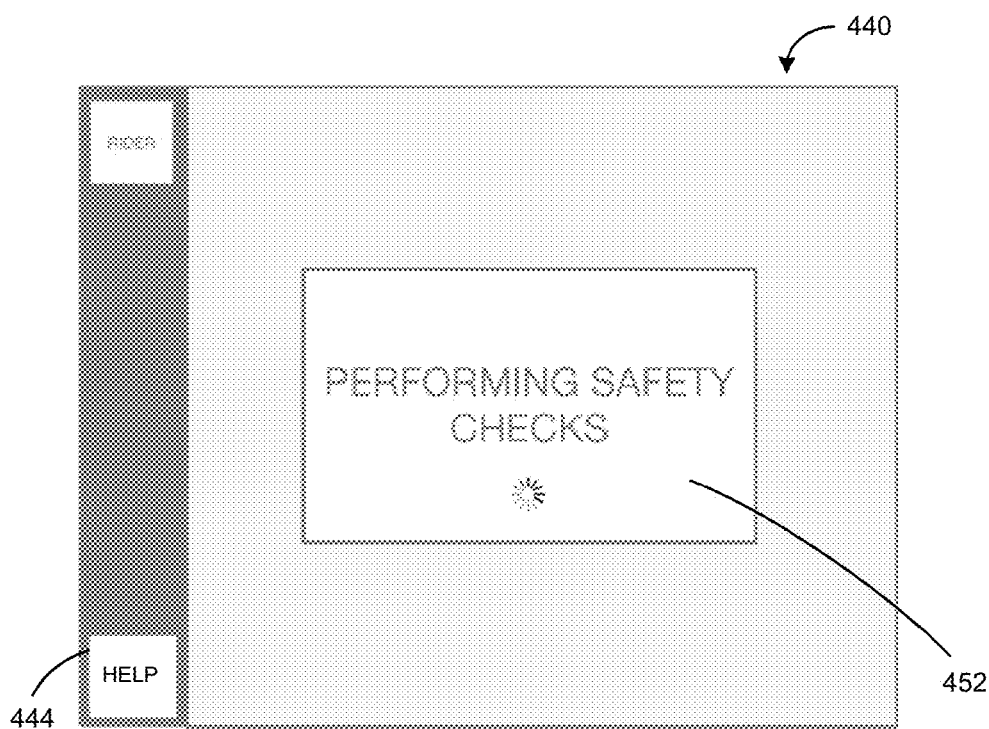

The AV system 151 can perform the transport service preparation procedure using a set of sensors of the AV 150. As illustrated in FIG. 4F, the UI 440 can display the safety checks that are being performed for the user, and as the various checks are being completed, the UI 440 can update the listed items 448. According to other examples, other items 448 can be included in the list to give the user confidence that the trip will be safe for the user (e.g., engine check ok, sensor check ok, etc.). As the AV system 151 performs the transport service preparation procedure, if a check does not satisfy or meet thresholds or safety parameters for a duration of time (e.g., thirty seconds) after initiating the check (e.g., a weight capacity, too many passengers for the number of seats or seat belts, door is not closed properly, etc.), the AV system 151 can provide detailed instructions 450, such as illustrated in FIG. 4G, to inform the user. The user can perform necessary actions that he or she can control in order for the transport service preparation procedure to be completed. In another example, FIG. 4H illustrates a UI 440 which displays a panel 452 showing that the safety checks are being performed for the user. If there errors with vehicle components or sub-systems (e.g., sensor failures, engine problems, etc.) are detected during the transport service preparation procedure, the AV system 151 can inform the user that the AV 150 should not be used and ask the user to leave the vehicle. The AV system 151 can transmit data about component errors to the service arrangement system 100 and information about the trip being canceled for the user.

Figure 4I:
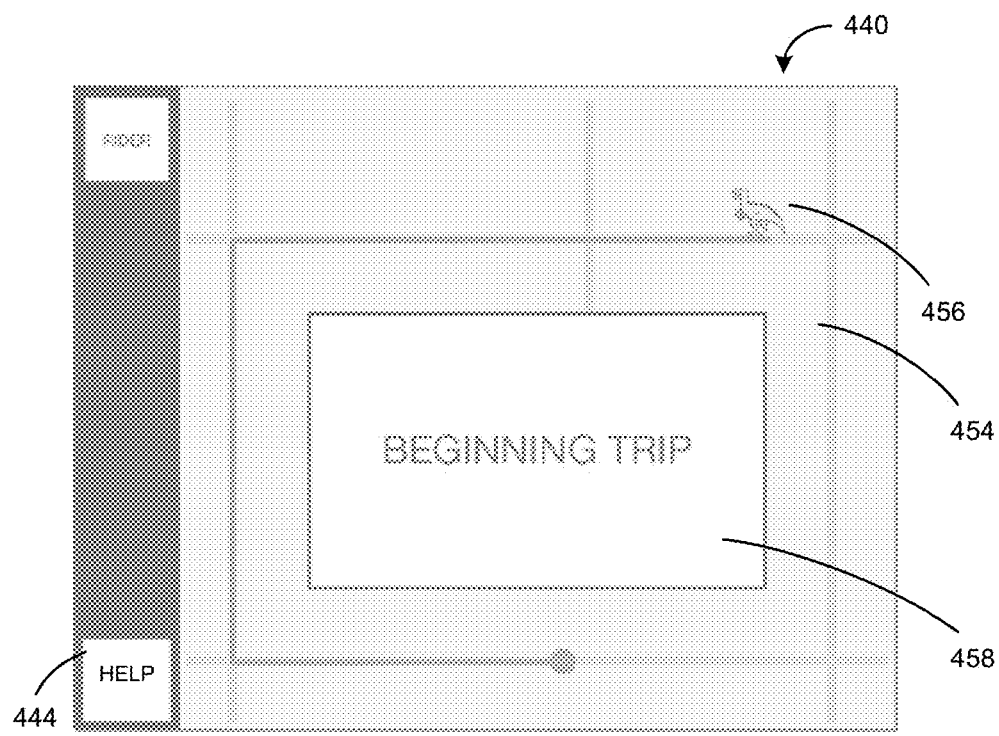

The AV system 151 can complete the transport service preparation procedure, based on sensor data of the AV 150, if safety and vehicle checks are properly completed (355). Once the transport service preparation procedure is completed, the AV system 151 can operate in a third state in which the AV system 151 controls the AV to travel to the destination location of the user (360). As illustrated in FIG. 4I, in one example, the AV system 151 can present in the UI 440, a map 454 showing the current location of the AV 150 as a graphic 456, the proposed route (in darker lines), and showing the destination location of the user (illustrated by the circle dot). When the AV system 151 operates in the third state to begin the transport service, a panel 458 can be displayed on the UI 440 to notify the user. As an addition or an alternative, the AV system 151 can provide a selectable feature "Begin Trip" that the user can input to start the transport service once the transport service preparation procedure is completed.

Figure 4J:
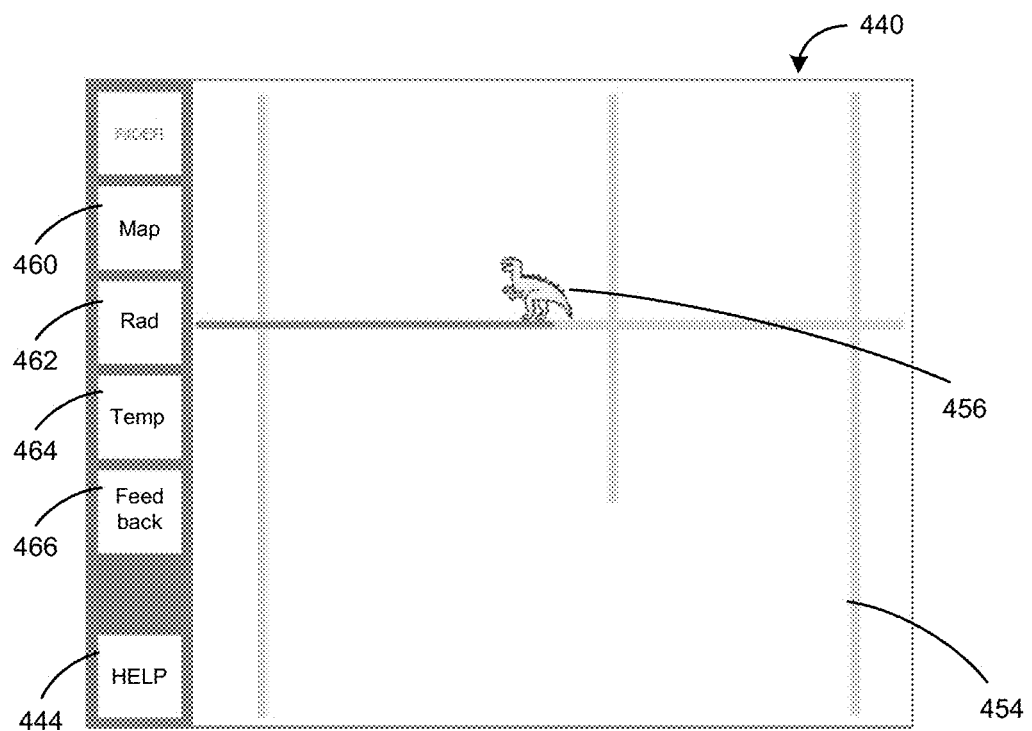

According to some examples, the AV system 151 can display additional user interfaces for the user while the AV 150 travels to the destination location. For example, as illustrated in FIG. 4J, the UI 440 can include a region (e.g., on the left hand side) where selectable features are provided to enable the user to at least partially control or operate the AV system 151. The selectable features can include a map feature 460 that, when selected, provides options for the user to view map details, change destination, view point of interest information, and have control over map functionality. A radio feature 462, when selected, provides options for the user to control the entertainment features of the AV 150, such as a presentation on the UI 440, a radio functionality, etc. A temperature feature 464 enables the user to control the temperature and internal climate of the AV 150. A feedback feature 466 can provide the user with options to leave complaints, questions, feedback, etc., for the transport service. Other selectable features (which are not shown in FIGS. 4D-M for purpose of simplicity) can include a feature to enable the user to make wait or delay requests for the AV 150, a "please stop" feature to cause the AV 150 to safely pull over as soon as possible, a feature to enable the user to view vehicle information (e.g., vehicle specifications), a feature to enable the user to view and/or edit the user's payment information and/or profile information (e.g., change user preferences), etc.

Figure 4K:
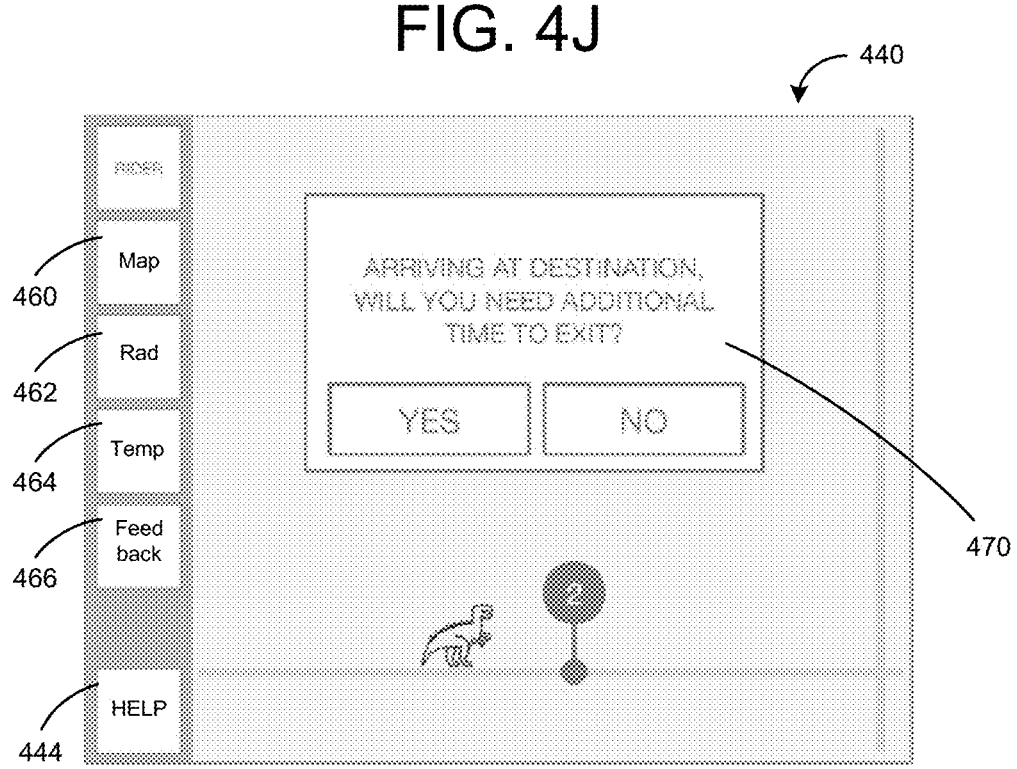

When the AV system 151 determines that the AV 150 is approaching or arriving at the destination location, the AV system 151 can present, on the display device, a notification to inform the user as such. Still further, in one example, the AV system 151 can display a panel 470 on the UI 440 to prompt the user to exit the vehicle (or have the option of requesting additional time to exit the vehicle), such as illustrated in FIG. 4K. The UI 440 can also display an estimated time of arrival (e.g., 2 minutes, such as shown in diagram H) or an estimated time the user has to exit the vehicle, in another example.

Figure 4L:
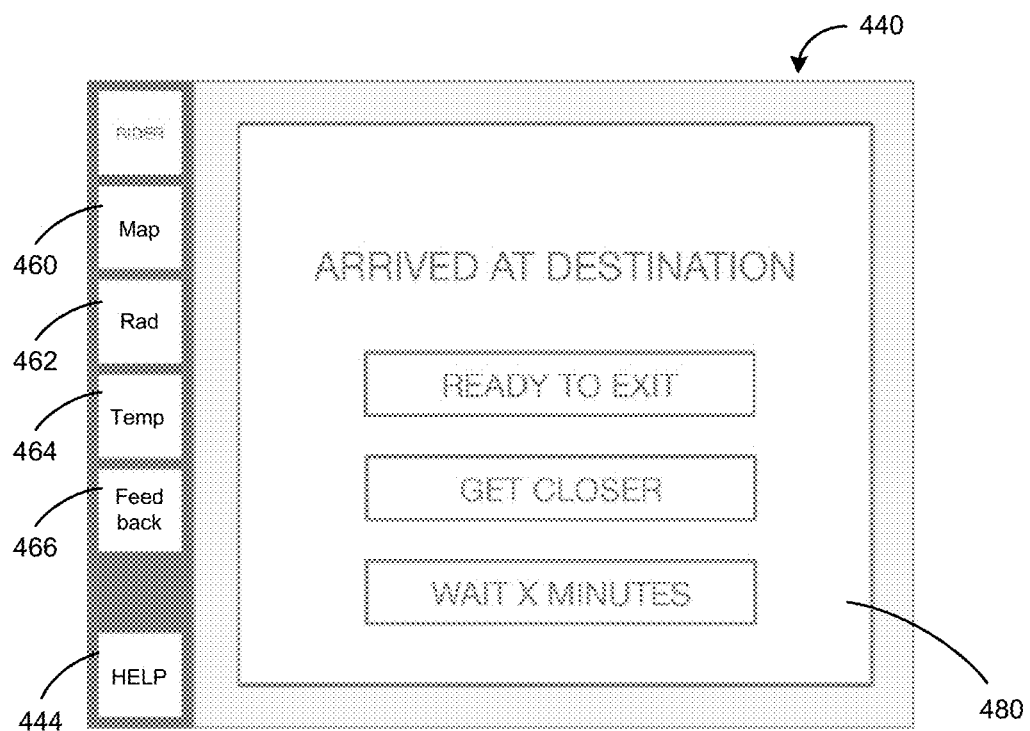

In some examples, the AV system 151 can also provide destination refinement controls for the user, such as illustrated in FIG. 4L. The destination refinement controls 480 can enable the user to make one or more selections to control the AV 150 with more granularity when the AV 150 is at or near the user's destination (e.g., within twenty meters, etc.).

The user can indicate, by selecting the feature "Ready to Exit," that he or she is ready to leave, which can cause the AV 150 to remain or be placed in a parked state (and/or have the engine turned off) so that the user can be confident that he or she can exit safely. In another example, in various situations, the AV 150 may be positioned on a street at or just near the destination (e.g., a restaurant or building), but the user may want the AV 150 to move a bit closer to the right to the curb or move further up. If the user selects the feature "Get Closer," in one example, the user can be presented with other options to better specify what the AV 150 should do (e.g., move further up 100 meters, move to the street corner, double park, find a safe place to stop near the curb, etc.). Still further, the user can select a feature to request waiting in the AV 150 for a specified duration of time (e.g., if the user is finishing up something on his or her laptop, is waiting to complete a phone call, is looking for an misplaced item, etc.). The user can specify the amount of time for the AV 150 to wait at a subsequent prompt on the UI 440. In one example, the trip for the user would not end until the user indicates that the user is ready to exit (e.g., the user can continue to be charged for the amount of time of the trip).

Figure 4M:
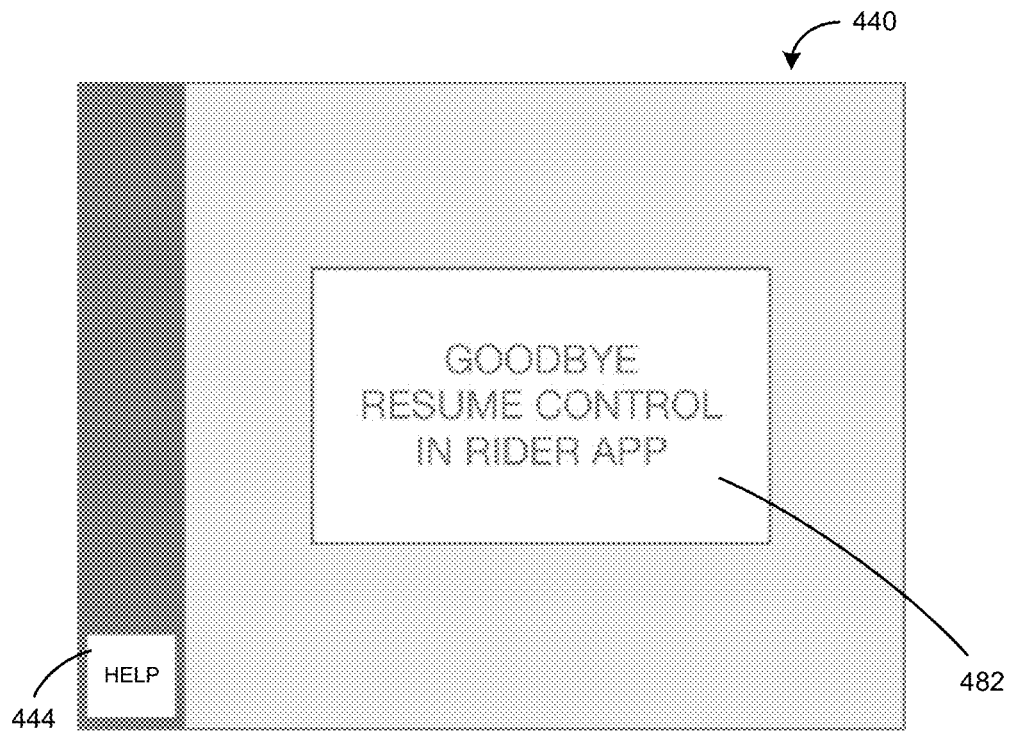

In one example, if the user ends the trip (e.g., emergency stop request, selects the "Ready to Exit" feature, etc.), the AV system 151 can present, on the display, a panel 482 on the UI 440 to inform the user that the trip is complete and/or that the user can access the client application 191, such as illustrated in FIG. 4M. Once the user closes the door (and once the AV 150 determines that people are no longer inside the internal cab using a set of sensors), the AV system 151 can cause the locking mechanisms of the doors of the AV 150 to be activated in order to lock the doors. When the trip ends for the user, the AV system 151 can operate in the first state (e.g., an online and available state) so that the AV 150 can be selected again to provide a subsequent transport service and can provide information that the trip has been completed and information about the AV 150 (e.g., the location and state) to the service arrangement system 100. The AV system 151 can also lock the RCA or turn off (or suspend) the display device of the AV 150. Depending on implementation, the AV system 151 can be programmed to remain at the current location for a duration of time in order to wait for another set of trip instructions for a subsequent transport service request or can be programmed to travel to a predetermined location or region.

Hardware Diagrams

Figure 5:
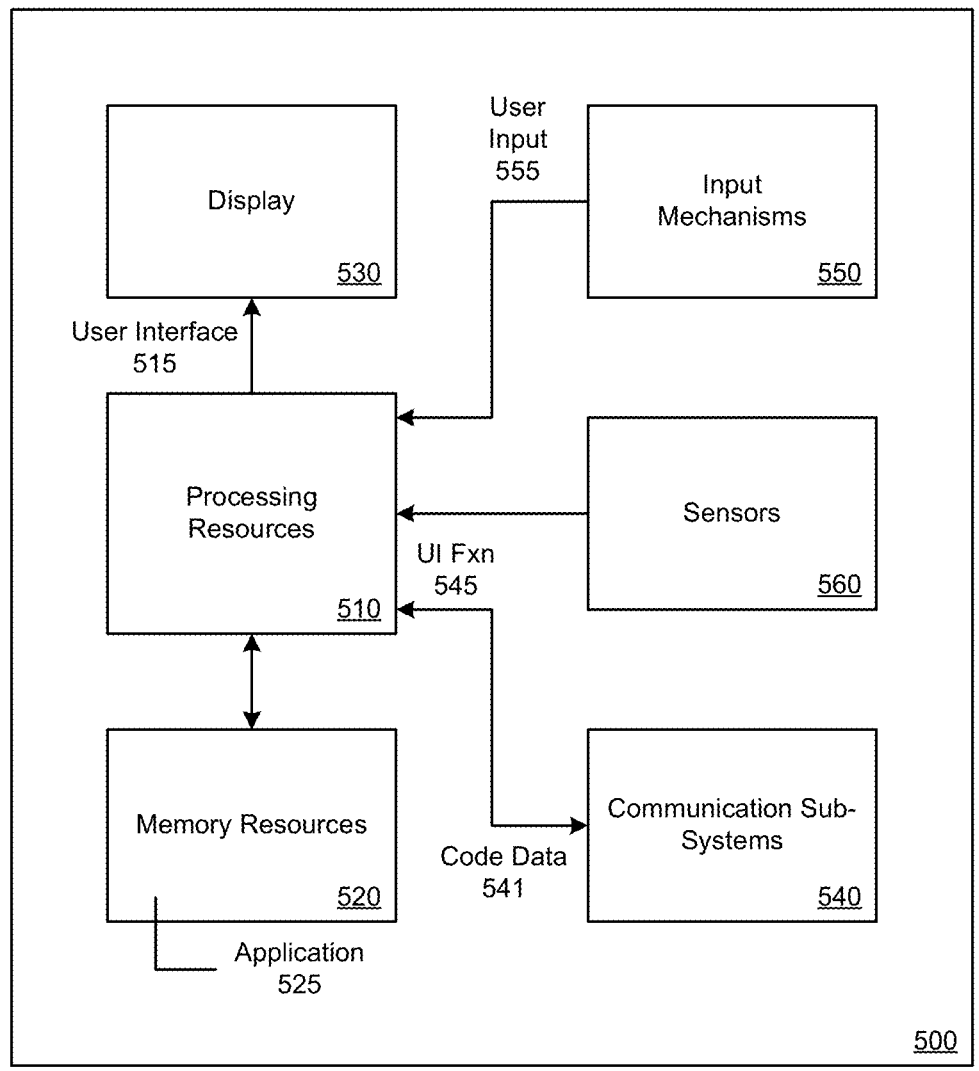
FIG. 5 is a block diagram that illustrates a computing device upon which embodiments described herein may be implemented.

FIG. 5 is a block diagram that illustrates a computing device upon which embodiments described herein may be implemented. In one example, a computing device 500 may correspond to a mobile computing device, such as a cellular device that is capable of telephony, messaging, and data services. The computing device 500 can correspond to a user device or a driver device. Examples of such devices include smartphones, handsets or tablet devices for cellular carriers. The computing device 500 includes a processor 510, memory resources 520, a display device 530 (e.g., such as a touch-sensitive display device), one or more communication sub-systems 540 (including wireless communication sub-systems), input mechanisms 550 (e.g., an input mechanism can include or be part of the touch-sensitive display device), and one or more sensors 560, including a location detection mechanism (e.g., GPS receiver). In one example, at least one of the communication sub-systems 540 sends and receives cellular data over data channels and voice channels. The communications sub-systems 540 can include a cellular transceiver and one or more short-range wireless transceivers. The processing resources 510 can receive communications from the service arrangement system, for example, via the communications sub-systems 540.

In the example of FIG. 5, the computing device 500 can correspond to a device that is operated by a user of the network service. The processor 510 can provide a variety of content to the display 530 by executing instructions stored in the memory resources 520. The memory resources 520 can store instructions corresponding to the client application 525, for example, and other data associated with the user in connection with the network service. For example, the processor 510 is configured with software and/or other logic to perform one or more processes, steps, and other functions described with implementations, such as described by FIGS. 1A through 4B, and elsewhere in the application. In particular, the processor 510 can execute instructions and data stored in the memory resources 520 in order to display UIs 515 of the service application 525. A user of the computing device 500 can interact with the UI 515 to make a request for a transport service using an AV. The processor 510 can also execute instructions corresponding to the client application 525 to cause other user interfaces 515 to be displayed on the display 530, such as a notification UI when the AV is selected for the user or when the AV is arriving at the user's pickup location. The processor 510 can also use code data 541 received from the service arrangement system 100 via the communications sub-systems 540 to display a specific code for the user to unlock the selected AV and/or the RCA of the selected AV.

According to some examples, the processing resources 510 can also use data corresponding to UI functionality 545 to provide features on a UI 515 of the client application 525 that were previously unavailable. The service arrangement system 100 can provide the UI functionality 545 for a duration of time when certain conditions are satisfied, such as the location of the selected AV in relation to the user's pickup location. When the user inputs specific data via the feature(s) provided by the UI functionality 545, the service arrangement system 100 can transmit a set of control signals to the selected AV.

Figure 6:
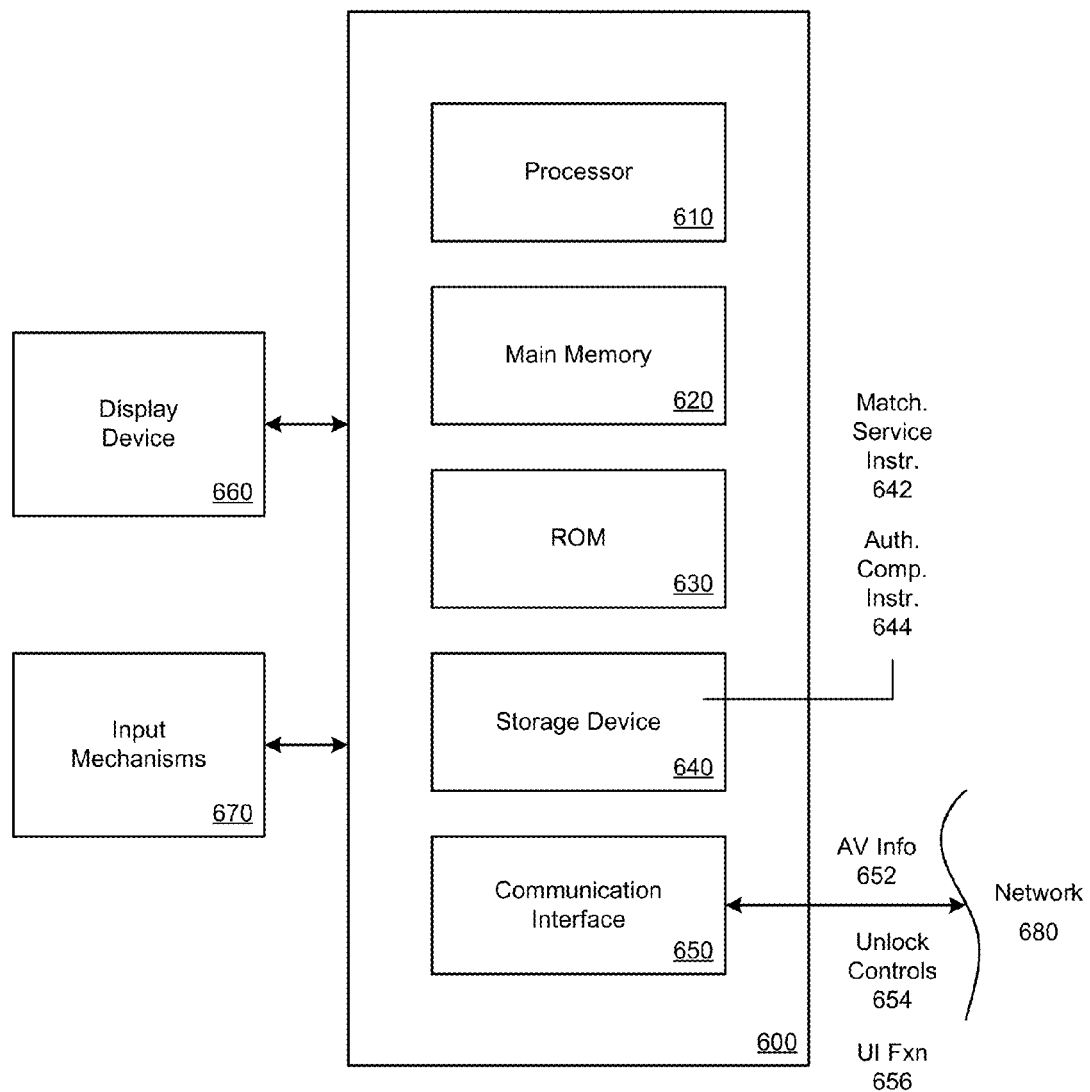
FIG. 6 is a block diagram that illustrates a computer system upon which examples described herein may be implemented.

FIG. 6 is a block diagram that illustrates a computer system upon which examples described herein may be implemented. For example, in the context of FIGS. 1A and 1B, the service arrangement system 100 may be implemented using a computer system such as described by FIG. 6. The service arrangement system 190 may also be implemented using a combination of multiple computer systems as described by FIG. 6. In another example, in the context of FIGS. 1A and 1C, the AV system 151 may be implemented using a computer system such as described by FIG. 6. In such an example, the computer system 600 can be provided within a vehicle housing, which can also include vehicle hardware, sub-systems, and sensors, such as described in FIG. 1C.

For purpose of simplicity, the computer system 600 is described in connection with the service arrangement system 100. In one implementation, the computer system 600 includes processing resources, such as one or more processors 610, a main memory 620, a read-only memory (ROM) 630, a storage device 640, and a communication interface 650. The computer system 600 includes at least one processor 610 for processing information and the main memory 620, such as a random access memory (RAM) or other dynamic storage device, for storing information and instructions to be executed by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. The storage device 640, such as a magnetic disk or optical disk, is provided for storing information and instructions.

For example, the storage device 640 can correspond to a computer-readable medium that stores matching service instructions 642 and authentication component instructions 644 for performing operations discussed with respect to FIGS. 1A through 5. In such examples, the computer system 600 can determine the statuses and locations of AVs (e.g., from AV information 652), determine the pickup and/or destination location of a requested transport service, select an AV for the transport service, provide instructions to cause the AV to travel to the pickup location, and perform security and authentication operations for the user and/or the AV in connection with the transport service. For example, the computer system 600 can transmit unlock control signals 654 to the AV to cause the AV to unlock one or more doors in order to allow a user to enter the AV. The computer system 600 can also provide UI functionality 656 to the user's computing device, such as described in FIGS. 1A through 5. In addition, the storage device 640 can include other data, such as data stored in the plurality of databases, such as described in FIG. 1B. As an addition or an alternative, databases can be stored in another data store that is accessible by the computer system 600.

The communication interface 650 can enable the computer system 600 to communicate with one or more networks 680 (e.g., cellular network) through use of the network link (wirelessly or using a wire). Using the network link, the computer system 600 can communicate with a plurality of devices, such as the mobile computing devices of the riders or users and with a plurality of AV computing systems. The computer system 600 can also include a display device 660, such as a cathode ray tube (CRT), an LCD monitor, or a television set, for example, for displaying graphics and information to a user. An input mechanism 670, such as a keyboard that includes alphanumeric keys and other keys, can be coupled to the computer system 600 for communicating information and command selections to the processor 610. Other non-limiting, illustrative examples of the input mechanisms 670 include a mouse, a trackball, touch-sensitive screen, or cursor direction keys for communicating direction information and command selections to the processor 610 and for controlling cursor movement on the display 660.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for controlling an autonomous vehicle, the method being implemented by one or more processors and comprising:
   receiving vehicle data from the autonomous vehicle as the autonomous vehicle progresses towards a pickup location of a first requester;
   receiving first requester data from a mobile computing device of the first requester, the first requester data indicating that the first requester is at or near the pickup location;
   receiving second requester data from one or more additional mobile computing devices of one or more additional requesters, the second requester data indicating that the one or more additional requesters are located at or near the pickup location;
   setting a threshold distance based on a number of the one or more additional requesters;
   determining when a position of the autonomous vehicle and a position of the first requester relative to the pickup location is within the threshold distance; and
   instructing the autonomous vehicle to perform one or more non-driving operations to facilitate use of the autonomous vehicle by the first requester.

2. The method of claim 1, further comprising:
   receiving user input from the mobile computing device of the first requester;
   verifying the user input; and
   wherein instructing the autonomous vehicle to perform the one or more non-driver operations includes instructing the autonomous vehicle to perform the one or more non-driving operations in response to verifying the user input.

3. The method of claim 2, wherein the user input includes one or more of (i) a code provided by the first requester, (ii) a unique identifier for the first requester or the mobile computing device, or (iii) a command entered through a service application on the mobile computing device to perform the one or more non-driving operations.

4. The method of claim 2, wherein a server receives the user input from the mobile computing device and the server verifies the user input.

5. The method of claim 2, wherein a server receives the user input from the mobile computing device and transmits data associated with the user input to the autonomous vehicle, and wherein the autonomous vehicle verifies the user input.

6. The method of claim 2, wherein the autonomous vehicle receives the user input from the mobile computing device using a short-range wireless communication medium.

7. The method of claim 6, wherein the short-range wireless communication medium includes one or more of Bluetooth, Near-field communication (NFC), or Wi-Fi.

8. The method of claim 1, wherein the first requester data includes one or more of global positioning system (GPS) data, data generated by a service application on the mobile computing device, or user input from the first requester.

9. The method of claim 1, wherein the one or more non-driving operations include deactivating one or more locking mechanisms of one or more doors of the autonomous vehicle.

10. The method of claim 1, wherein the one or more non-driving operations include notifying the first requester that the autonomous vehicle has arrived by operating one or more of (i) a set of lights, (ii) a set of sound-making devices, or (iii) a set of output components of the autonomous vehicle in a predetermined pattern for a duration of time prior to the first requester entering the autonomous vehicle.

11. The method of claim 1, wherein the one or more non-driving operations include opening a trunk of the autonomous vehicle.

12. A system for controlling an autonomous vehicle comprising:
one or more processors; and
one or more memory resources storing instructions that, when executed by the one or more processors, cause the system to:
receive vehicle data from the autonomous vehicle as the autonomous vehicle progresses towards a pickup location of a first requester;
receive first requester data from a mobile computing device of the first requester, the first requester data indicating that the first requester is at or near the pickup location;
receive second requester data from one or more additional mobile computing devices of one or more additional requesters, the second requester data indicating that the one or more additional requesters are located at or near the pickup location;
set a threshold distance based on a number of the one or more additional requesters;
determine when a position of the autonomous vehicle and a position of the first requester relative to the pickup location is within the threshold distance; and
instruct the autonomous vehicle to perform one or more non-driving operations to facilitate use of the autonomous vehicle by the first requester.

13. The system of claim 12, wherein the memory resources store instructions that when executed, cause the one or more processors to:
receive user input from the mobile computing device of the first requester;
verify the user input; and
wherein the instructions further cause the one or more processors to instruct the autonomous vehicle to perform the one or more non-driving operations in response to verifying the user input.

14. The system of claim 13, wherein the user input includes one or more of (i) a code provided by the first requester, (ii) a unique identifier for the first requester or the mobile computing device, or (iii) a command entered through a service application on the mobile computing device to perform the one or more non-driving operations.

15. The system of claim 13, wherein the one or more processors are provided on, at least, a server.

16. The system of claim 12, wherein the first requester data includes one or more of global positioning system (GPS) data, data generated by a service application on the mobile computing device, or user input from the first requester.

17. A system comprising:
one or more servers to:
receive vehicle data from an autonomous vehicle as the autonomous vehicle progresses towards a pickup location of a first requester;
receive first requester data from a mobile computing device of the first requester, the first requester data indicating that the first requester is at or near the pickup location;
receive second requester data from one or more additional mobile computing devices of one or more additional requesters, the second requester data indicating that the one or more additional requesters are located at or near the pickup location;
set a threshold distance based on a number of the one or more additional requesters;
determine when a position of the autonomous vehicle and a position of the first requester relative to the pickup location is within the threshold distance; and
send instructions to the autonomous vehicle when the position of the autonomous vehicle and the position of the first requester relative to the pickup location is within the threshold distance; and
an autonomous vehicle to:
perform one or more non-driving operations to facilitate use of the autonomous vehicle by the first requester based on the instructions.

18. The system of claim 17, wherein the one or more servers receive user input that verifies the first requester.

19. The system of claim 17, wherein the autonomous vehicle receives user input that verifies the first requester.

20. The system of claim 19, wherein the autonomous vehicle receives the user input over a short-range wireless communication medium.

21. The system of claim 17, wherein the autonomous vehicle performs one or more non-driving operations that include deactivating one or more locking mechanisms of one or more doors of the autonomous vehicle.

22. The system of claim 17, wherein the autonomous vehicle performs one or more non-driving operations that include notifying the first requester that the autonomous vehicle has arrived by operating one or more of (i) a set of lights, (ii) a set of sound-making devices, or (iii) a set of output components of the autonomous vehicle in a predetermined pattern for a duration of time prior to the first requester entering the autonomous vehicle.

23. The system of claim 17, wherein the autonomous vehicle performs one or more non-driving operations that include opening a trunk.

* * * * *